United States Patent
Gladwin et al.

(10) Patent No.: US 8,707,091 B2
(45) Date of Patent: Apr. 22, 2014

(54) FAILSAFE DIRECTORY FILE SYSTEM IN A DISPERSED STORAGE NETWORK

(75) Inventors: S. Christopher Gladwin, Chicago, IL (US); Gary W. Grube, Barrington Hills, IL (US); Jason K. Resch, Chicago, IL (US); Timothy W. Markison, Mesa, AZ (US)

(73) Assignee: Cleversafe, Inc., Chicago, IL (US)

( * ) Notice: Subject to any disclaimer, the term of this patent is extended or adjusted under 35 U.S.C. 154(b) by 374 days.

(21) Appl. No.: 13/021,657

(22) Filed: Feb. 4, 2011

(65) Prior Publication Data

US 2011/0225450 A1 Sep. 15, 2011

Related U.S. Application Data

(60) Provisional application No. 61/313,885, filed on Mar. 15, 2010.

(51) Int. Cl.
*G06F 11/20* (2006.01)

(52) U.S. Cl.
USPC ........... 714/6.24; 714/6.2; 714/6.23; 714/6.3; 709/216

(58) Field of Classification Search
USPC ........ 714/6.2, 6.22, 6.23, 6.24, 6.31; 709/216
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Joseph Schell
(74) *Attorney, Agent, or Firm* — Garlick & Markison; Timothy W. Markison

(57) ABSTRACT

A file directory system comprises a directory file, a directory address for the directory file, and a directory address failsafe mechanism. The directory file includes one or more directory entries and one or more corresponding addresses for the one or more directory entries. The directory address failsafe mechanism functions to dispersed storage error encode the directory address to produce a plurality of encoded components of the directory address and transmit the plurality of encoded components of the directory address to a plurality of agent modules.

19 Claims, 21 Drawing Sheets

(56) References Cited

U.S. PATENT DOCUMENTS

| | | |
|---|---|---|
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 * | 4/2004 | Basani et al. ............ 709/201 |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,203,871 B2 * | 4/2007 | Turner et al. ............ 714/710 |
| 7,222,133 B1 | 5/2007 | Raipurkar et al. |
| 7,240,236 B2 | 7/2007 | Cutts et al. |
| 7,272,613 B2 * | 9/2007 | Sim et al. ............ 709/223 |
| 7,502,832 B2 * | 3/2009 | San Andres et al. ......... 709/216 |
| 2002/0062422 A1 | 5/2002 | Butterworth et al. |
| 2002/0147815 A1 * | 10/2002 | Tormasov et al. ............ 709/226 |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 * | 4/2007 | Gladwin et al. ............ 711/154 |
| 2007/0079083 A1 | 4/2007 | Gladwin et al. |
| 2007/0088970 A1 | 4/2007 | Buxton et al. |
| 2007/0094269 A1 * | 4/2007 | Mikesell et al. ............ 707/10 |
| 2007/0094310 A1 * | 4/2007 | Passey et al. ............ 707/204 |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

* cited by examiner computing system 10

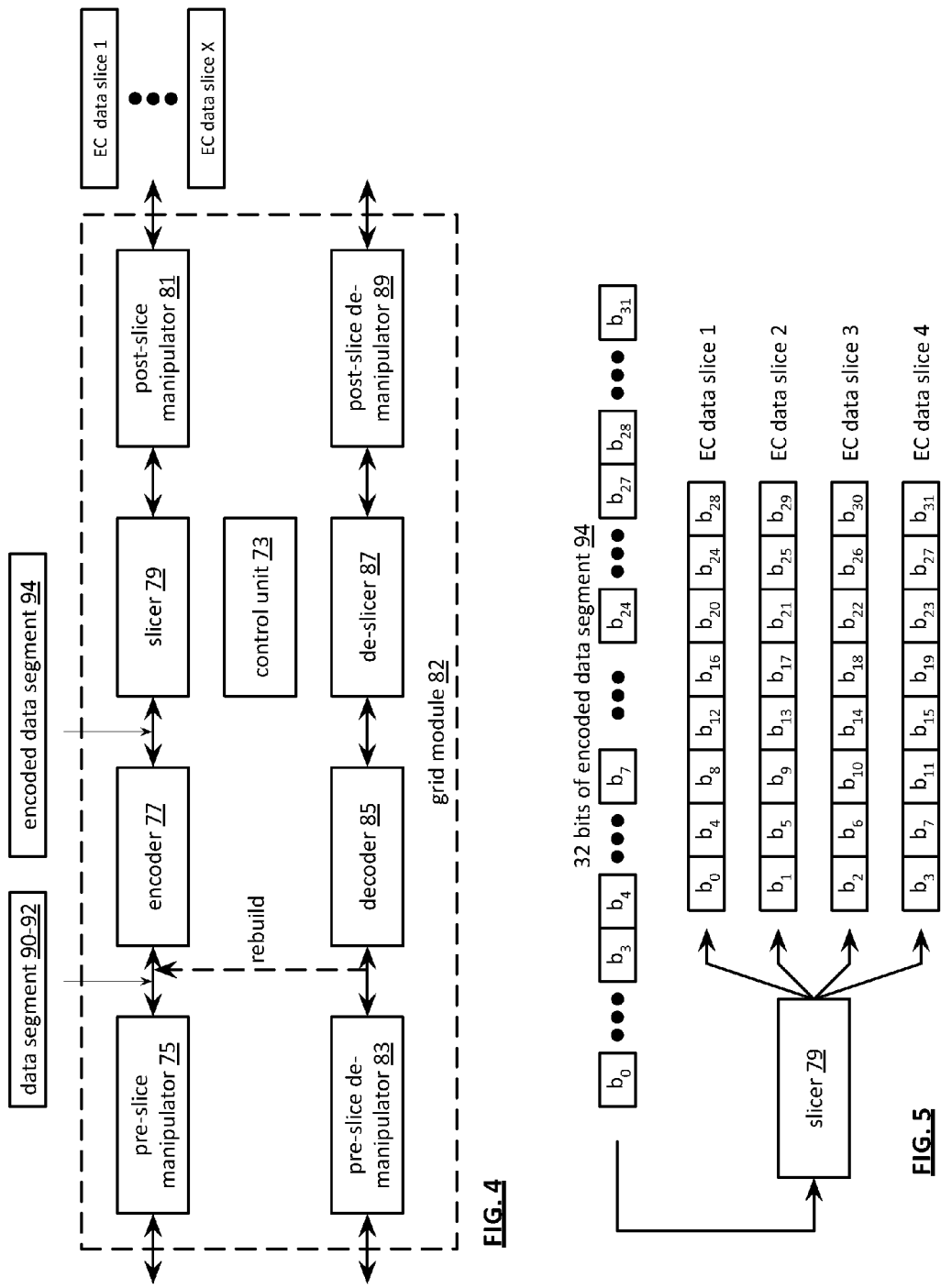

FIG. 8A primary root directory file 200

| file or directory name 212 | DSN address 218 |
|---|---|
| /user | 0010 |
| /bin | 0020 |
| /home | 0030 |

DSN addr 206: root = 0000 intermediate directory file 150

| file or directory name 162 | DSN address 168 |
|---|---|
| /user/charts | 0011 |
| /user/temp | 0015 |
| /user/docs | 0017 |

DSN addr 156: addr 0010 file-level directory file 152

| file or directory name 164 | DSN address 170 |
|---|---|
| /user/temp/pic.jpg | 0019 |
| /user/temp/lists | 0100 |
| /user/temp/picture.jpg | 0078 |

DSN addr 158: addr 0015

FIG. 8B redundant root directory file 202

| file or directory name 214 | DSN address 220 |
|---|---|
| /user | 1010 |
| /bin | 1020 |
| /home | 1030 |

DSN addr 208: root = 1000 intermediate directory file 174

| file or directory name 186 | DSN address 192 |
|---|---|
| /user/charts | 1011 |
| /user/temp | 1015 |
| /user/docs | 1017 |

DSN addr 180: addr 1010 file-level directory file 176

| file or directory name 188 | DSN address 194 |
|---|---|
| /user/temp/pic.jpg | 0019 |
| /user/temp/lists | 1100 |
| /user/temp/picture.jpg | 0078 |

DSN addr 182: addr 1015

US 8,707,091 B2

FAILSAFE DIRECTORY FILE SYSTEM IN A DISPERSED STORAGE NETWORK

CROSS REFERENCE TO RELATED PATENTS

This patent application is claiming priority under 35 USC §119(e) to a provisionally filed patent application entitled "DISTRIBUTED STORAGE SYSTEM ACCESS," having a provisional filing date of Mar. 15, 2010, and a provisional Ser. No. 61/313,885, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the invention;

FIG. 5 is a diagram of an example embodiment of error coded data slice creation in accordance with the invention;

FIG. 8A is a diagram of another example of a dispersed storage network directory structure in accordance with the invention;

FIG. 8B is a diagram of another example of a dispersed storage network directory structure in accordance with the invention;

DETAILED DESCRIPTION OF THE INVENTION

Figure 1:
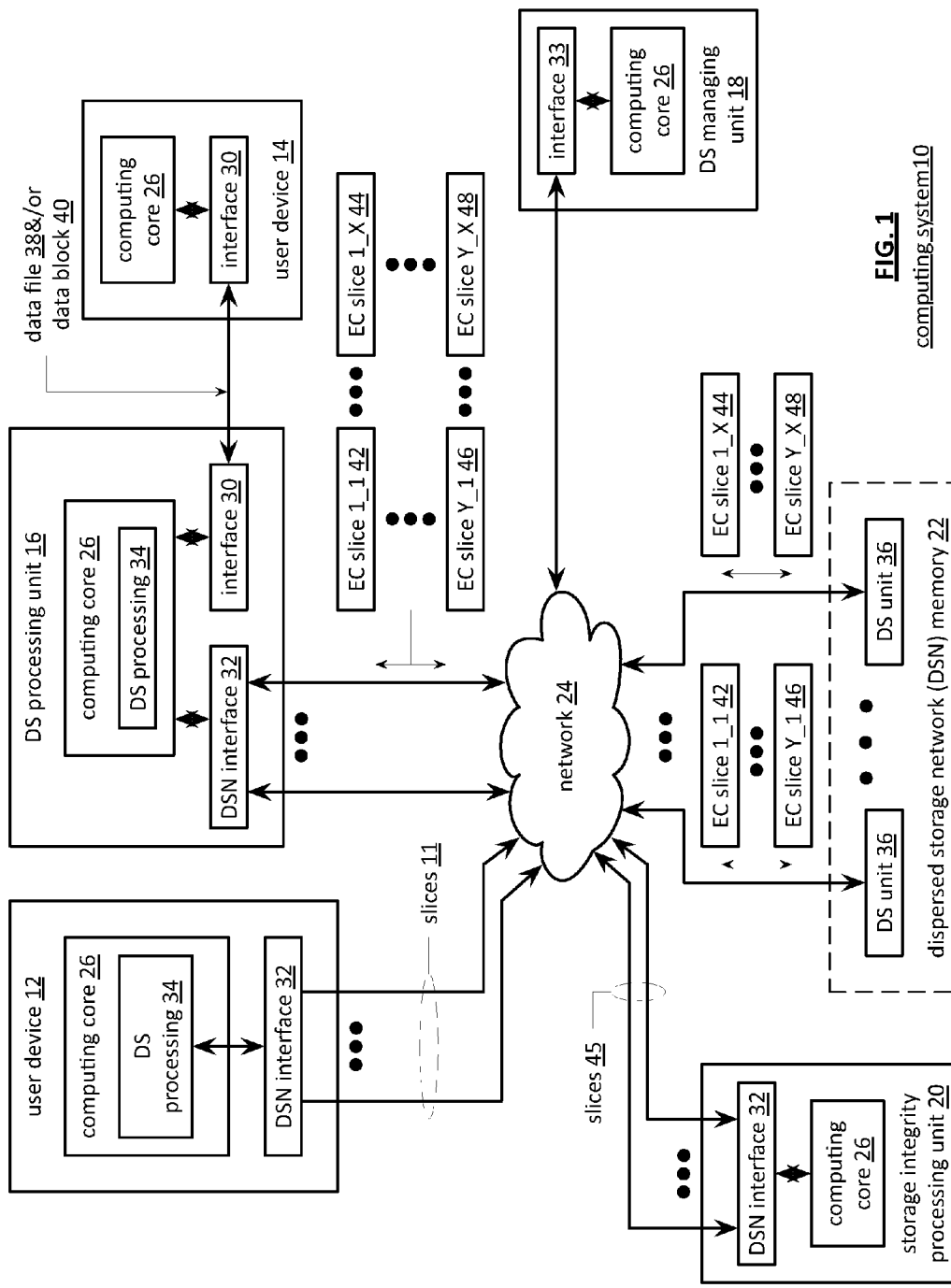
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-19.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security. Further examples of encoding the data segments will be provided with reference to one or more of FIGS. 2-19.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
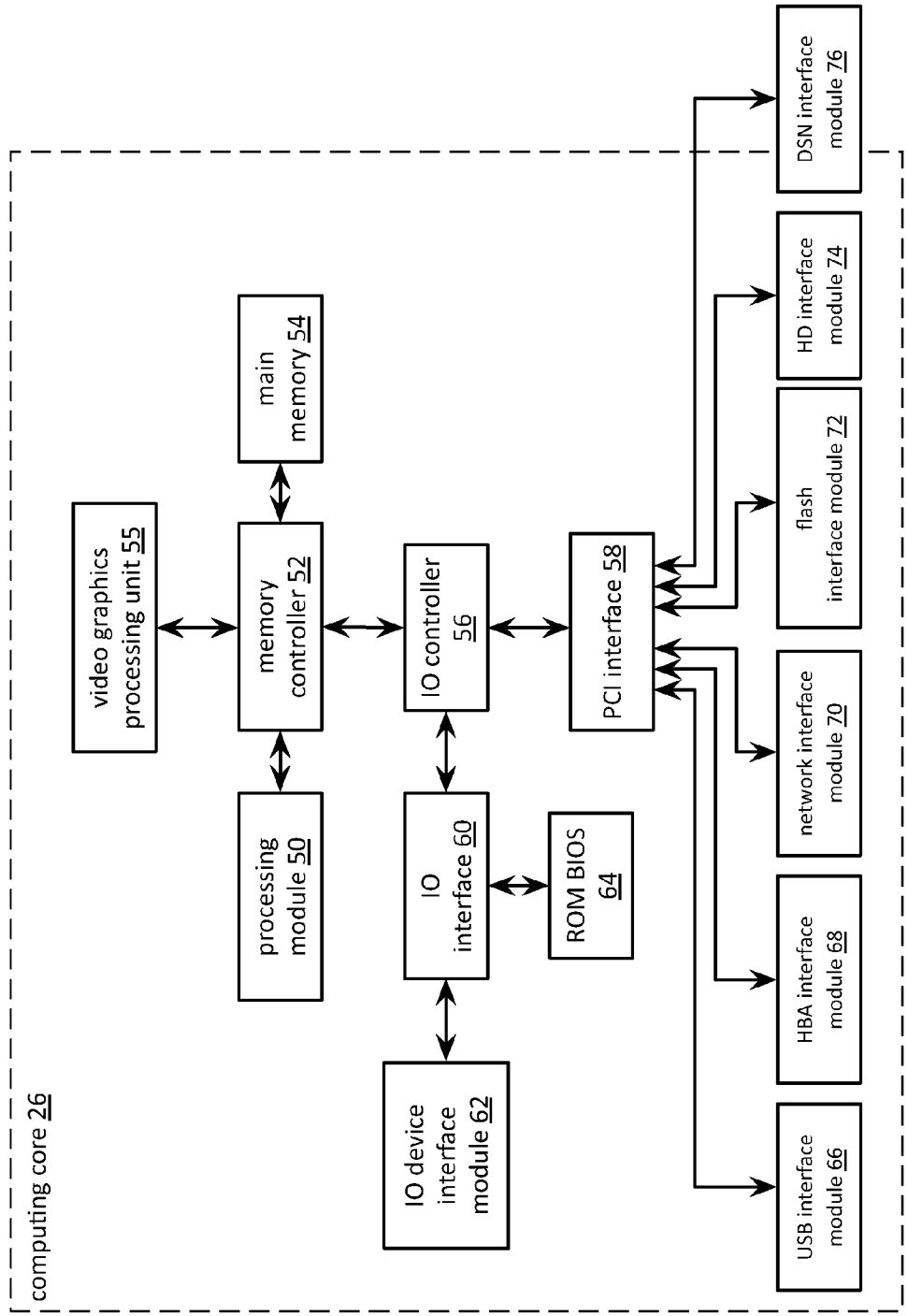
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-19.

Figure 3:
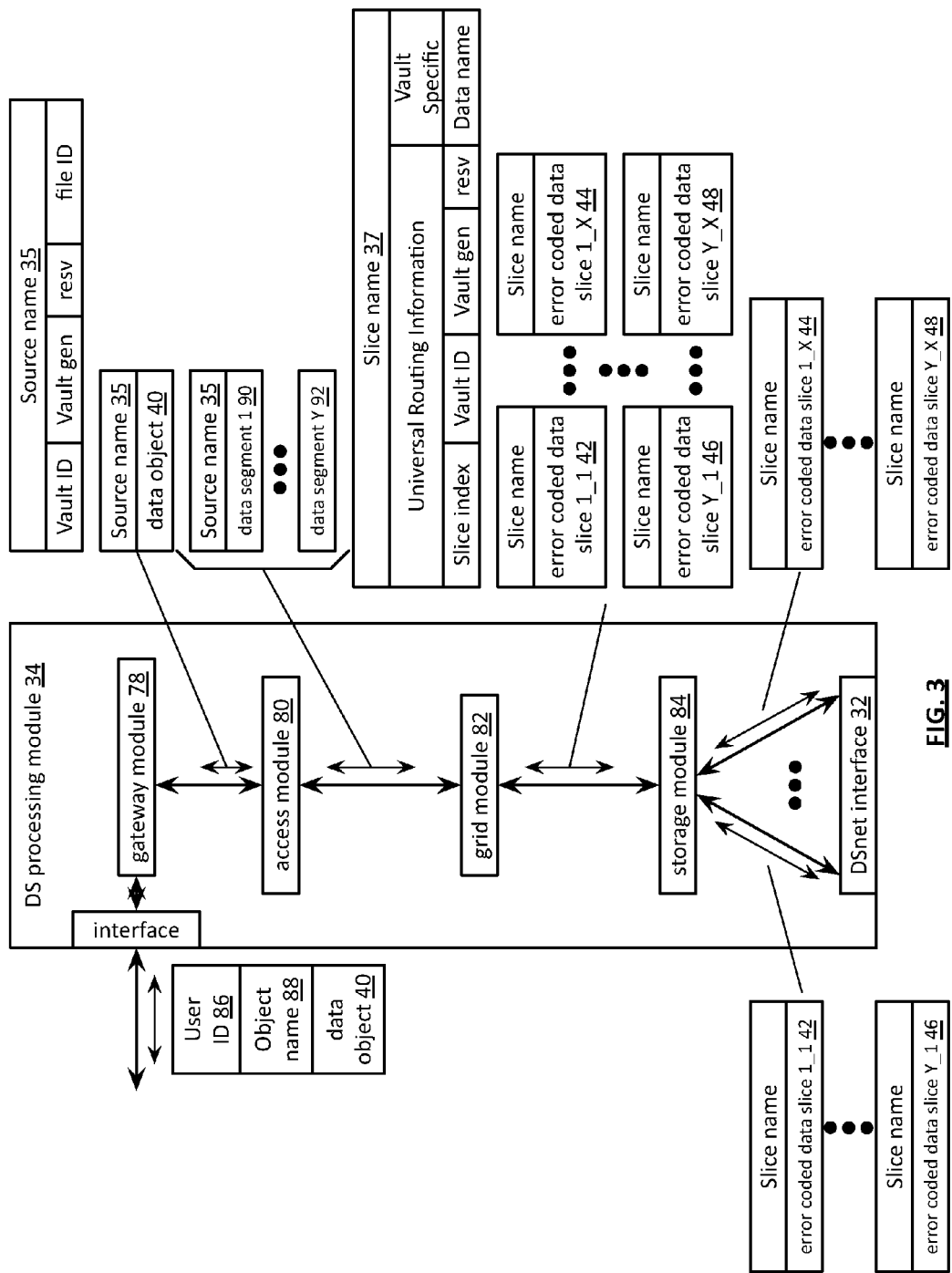
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 60 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
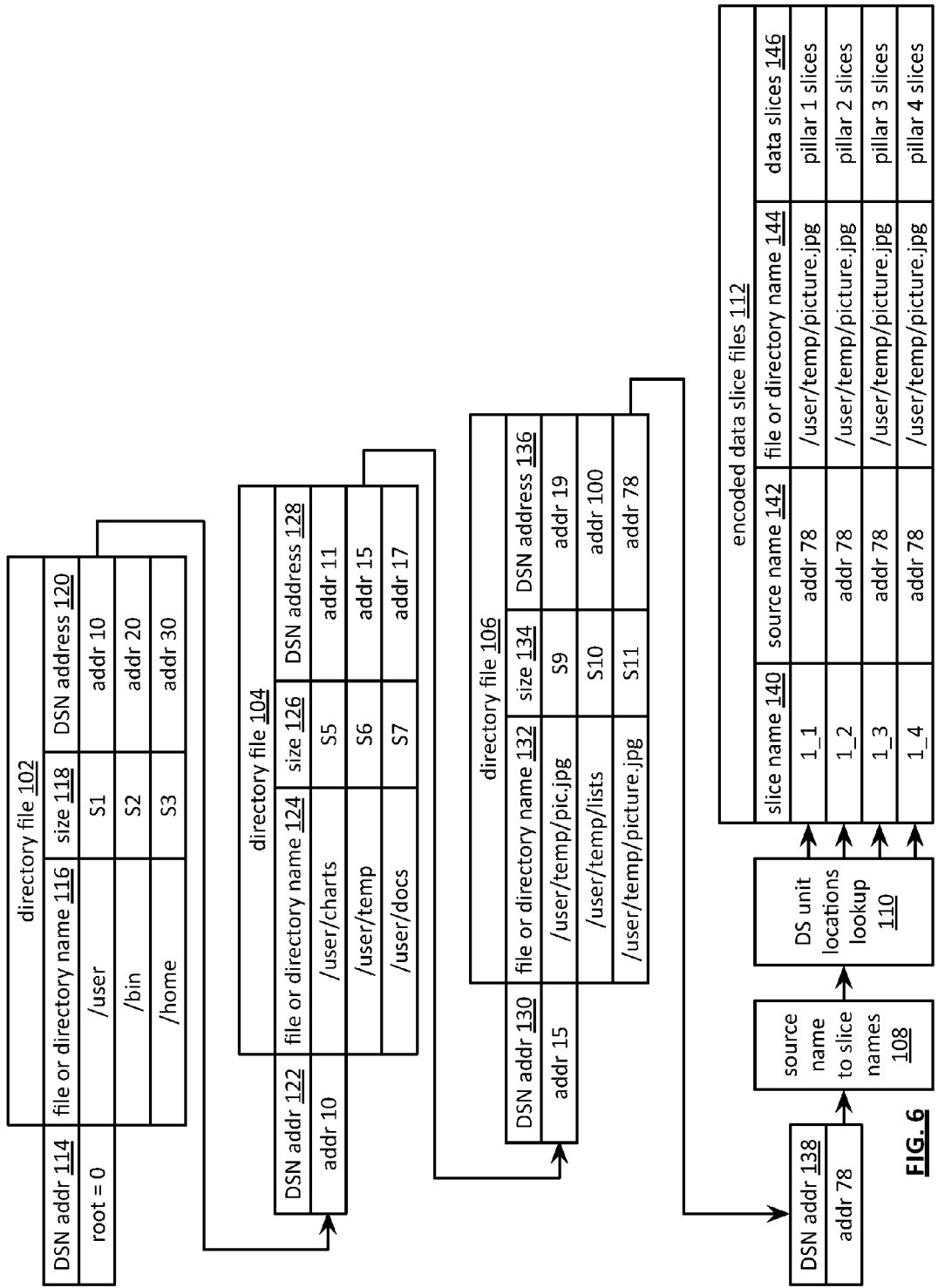
FIG. 6 is a diagram of an example of a dispersed storage network directory structure in accordance with the invention.

FIG. 6 is a diagram of an example of a dispersed storage network (DSN) directory structure that includes a plurality of directory files 102-106 linking to encoded data slices files 112. Such a directory structure may be utilized to determine a DSN address where encoded data slices are stored that correspond to a particular data object name. Note that the plurality of directory files 102-106 structure includes chaining such that a parent directory file points to a plurality of children record files and so on through any number of layers such that a DSN address (e.g., source name) contained in the last layer may be utilized to access corresponding encoded data slices of a desired data object name. For example, a set of chained directory files represents a directory structure for one user vault. As another example, a set of chained directory files represents a directory structure for two or more user vaults. Note that a first directory file (e.g., a root directory file) may be addressed at a predetermined DSN address (e.g., a root address such as address 0000) and subsequent children directory files are linked back to the first directory file. Further note that the plurality of directory files 102-106 is stored in memory to be subsequently retrieved when it is desired to access one or more data files referenced by the directory structure. For example, the plurality of directory files 102-106 is stored as encoded directory slices in a DSN memory.

The directory files 102-106 include one or more directory entries 116, 124, 132, one or more corresponding addresses 120, 128, 136 for the one or more directory entries 116, 124, 132, and a size field 118, 126, 134; where the directory entries 116, 124, 132 include at least one of a directory pathname and a file name. As such, directory entries 116, 124, 132, may depict a directory path to a corresponding layer of the directory structure or a file name that is stored at a DSN address of the DSN address field 120, 128, 136. Note that the directory file may include a flag to signify that the file or directory name field contains a filename or a directory name. The size field 118, 126, 134 represents the number of bytes contained in the subsequent directory files and encoded directory slice files at layers below a current layer. The one or more corresponding addresses 120, 128, 136 may be utilized to depict a DSN address (e.g., a source name) of a child layer that is at a next layer down in the directory structure. Each of the directory files 102-106 is associated with a directory address 114, 122, and 130. For example, the directory addresses 114, 122, 130 include a DSN address of where slices are stored associated with the corresponding directory file. Note that the directory address 114 constitutes a root directory address (e.g., =0) when the directory file constitutes a root directory file 102.

In an example, directory file 104 is stored at DSN address 10 and contains three entries. The first entry has a file or directory name field 124 value of /user/charts to signify that the pathname at this layer is /user/charts, a size field value of S5 (e.g., 4 gigabytes), and a DSN address of address 11 (e.g., the source of the next layer along that pathname). The second entry has a file or directory name field value of /user/temp to signify that the pathname at this layer is /user/temp, a size field value of S6, and a DSN address of address 15. The third entry has a file or directory name field value of /user/docs to signify that the pathname at this layer is /user/docs, a size field value of S7, and a DSN address of address 17.

Note that the /user pathname of the first directory file (e.g., root directory file 102) points to a second (e.g., intermediate) directory file (e.g., directory file 104 at DSN address 10). The /user/temp pathname of the second directory file points to a third directory file 106 at DSN address 15. The /user/temp/picture.jpg file name of the third directory file points to DSN address 78 where encoded data slices are stored for this data object name. The DSN address 78 (e.g., the source name) is utilized to determine slice names where the encoded data slices are stored utilizing the source name to slice names 108 process previously described. The slice names are utilized to look up dispersed storage (DS) unit locations (e.g., in the virtual DSN address to physical location table) in a DS unit locations look up process 110 as previously discussed to determine where the encoded data slices are stored in the DSN memory.

The encoded data slice files 112 include a slice name field 140, a source name field 142, a file or directory name field 144, and encoded data slices 146 and may further include one or more of a checksum field, a metadata field, a data size field, the user identifier (ID) field, and a vault ID. In an example, the encoded data slice files 112 are organized in a four pillar wide system. The slice name field 140 includes slice names 1_1, 1_2, 1_3, and 1_4. The source name field 142 includes DSN address 78. The file or directory name field 144 includes the filename /user/temp/picture.jpg. The encoded data slices pillar field 146 includes pillar-slices addresses for each of the four pillars, which, in this example, corresponds to one of Y data segments. The encoded data slice files are stored in the memory of the DS unit as previously discussed.

In a data retrieval example of operation, a processing module determines a root directory dispersed storage network (DSN) address based on a user vault lookup for a requested data ID. Note that the data ID may include at least one of a filename, a directory name, a path, and a block number. Next, the processing module retrieves a set of encoded root directory slices from a DSN memory based on the root directory DSN address. The processing module dispersed storage error decodes the set of encoded root directory slices to reproduce a root directory, which includes at least one of a filename, a path, a size indicator, and a DSN address. The processing module utilizes the DSN address to link to either a file stored as slices in a DSN memory or to a directory file that is stored as slices in the DSN memory. Note that there may be any number of linked intermediate directory files between the root directory and a directory file containing the DSN address of a desired filename. The processing module determines if the root directory includes a DSN address that links to another record file or to a desired file based on whether any of the entries of the directory include a desired filename of the desired file. The processing module extracts a data DSN address from the root directory when the filename is stored in the root directory.

The processing module enters into a processing sequence when the filename corresponding to a desired data ID is not stored in the root directory. In such a processing sequence, the processing module begins the sequence by extracting a current intermediate directory DSN address from a preceding directory (e.g., the root directory during a first portion of the sequence); where the current intermediate directory DSN address includes at least one source name and at least one slice name. Next, the processing module retrieves a set of encoded current intermediate directory slices from the DSN memory based on the current intermediate directory DSN address. The method of the sequence continues where the processing module dispersed storage error encodes the set of encoded current intermediate directory slices to reproduce a current intermediate directory.

Next, the processing module determines whether the filename is stored in the current intermediate directory. The processing module repeats the processing sequence for a next current intermediate directory DSN address when the filename is not stored in the current intermediate directory. The processing module extracts a data DSN address and exits the processing sequence when the filename is stored in the current intermediate directory. In the retrieval example of operation continued, the processing module retrieves a set of encoded data slices from the DSN memory based on a data DSN address subsequent to the processing sequence. Next, the processing module dispersed storage error encodes the set of encoded data slices to reproduce data.

In a data storage example of operation, a method begins where a processing module receives a data storage request, which may include data and a data identifier (ID). Next, the processing module dispersed storage error encodes the data to produce a set of encoded data slices. The method continues with the processing module determining a data dispersed storage network (DSN) address based on the data ID. Such a data DSN address may include at least one of a source name and at least one slice name. The method continues with the processing module sending the set of encoded data slices to a DSN memory for storage at the data DSN address. The method continues with the processing module updating a directory file with path information corresponding to the data ID and the data DSN address to produce an updated directory file. Note that the directory file may include one or more directories, wherein a directory of the one or more directories includes at least one of a filename, a path, a size indicator, and a DSN address.

When updating the directory file, the processing module determines whether the directory file is stored in the DSN memory, retrieves a set of encoded directory slices from the DSN memory based on the directory DSN address, and dispersed storage error decodes the set of encoded directory slices to reproduce the directory file when the processing module determines that the directory file is stored in the DSN memory. The processing module creates the directory file to include at least one of a filename field, a path field, a size indicator field, and a DSN address field when the directory file is not stored in the DSN memory. Alternatively, or in addition to, the processing module may update the directory file by obtaining a parent directory (e.g., another higher level intermediate directory or the root directory), updating the parent directory with the directory DSN address and at least a portion of the data ID (e.g., a path) to produce an updated parent directory, dispersed storage error encoding the updated parent directory to produce a set of encoded updated parent directory slices, and sending the set of encoded updated parent directory slices to the DSN memory for storage at a parent directory DSN address. The storage example of operation continues with the step where the processing module dispersed storage error encodes the updated directory file to produce a set of encoded updated directory slices. Next, the processing module sends the set of encoded updated directory slices to the DSN memory for storage at a directory DSN address.

As yet another example, a first set of chained directory files may represent a directory structure for a first vault where the root address starts at a first DSN address and a second set of chained directory files may represent the directory structure for the same first vault for the root address starts at a second DSN address. Note that in this example the second set of chained directory files may be a redundant backup copy of the directory of the first vault. Note that the first and/or second DSN addresses may be predetermined and/or variable. Further note that the root address is critical to access the contents of the DSN memory, and as such, determination of or knowledge of the root address is both critical for normal operation and can be a security issue if available to unauthorized users. Note that multiple redundant directory copies may be stored in the DSN memory to further improve the overall availability of the directory that they represent.

Figure 7A:
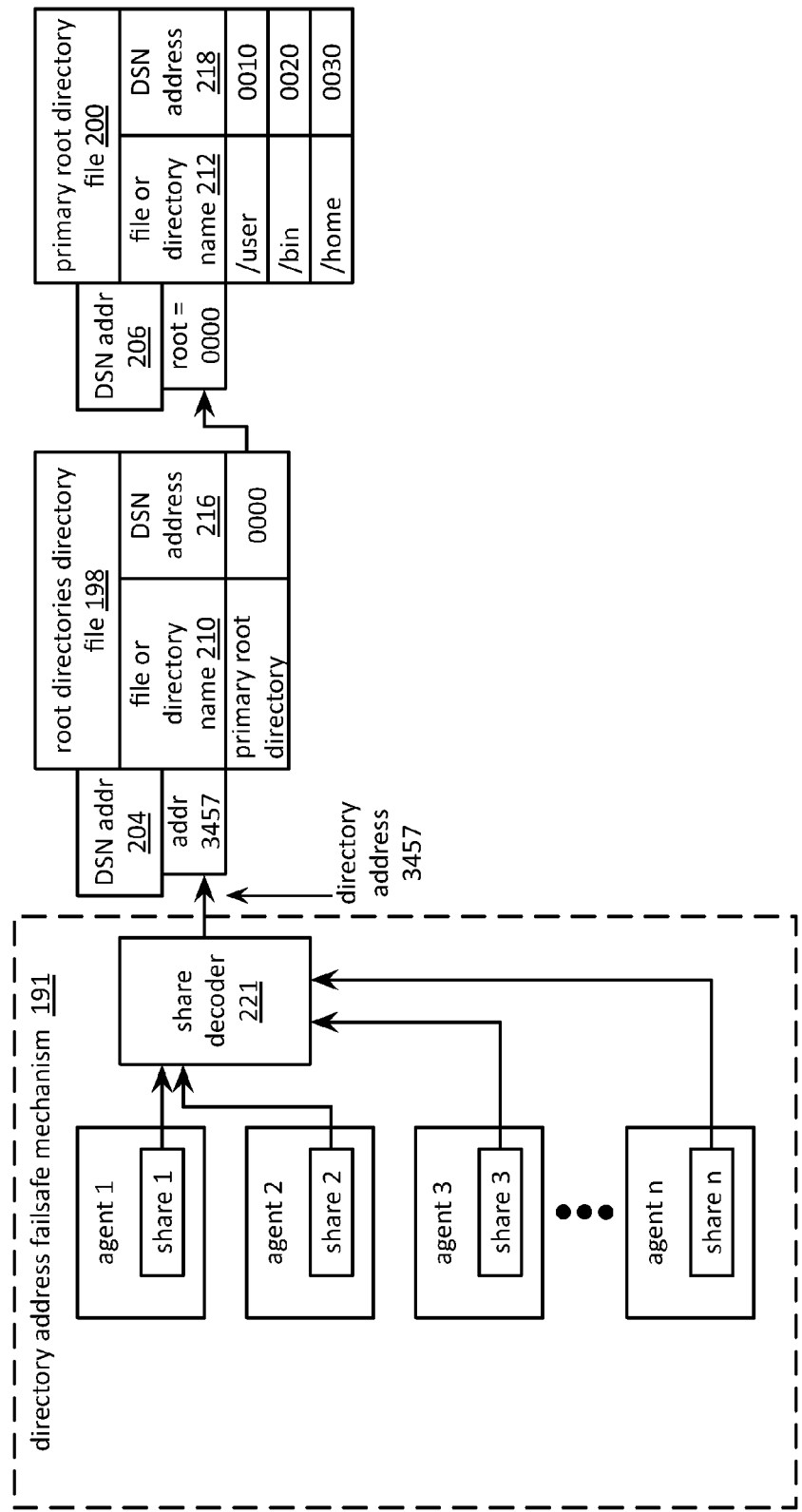
FIG. 7A is a diagram of another example of a dispersed storage network directory structure in accordance with the invention.

FIG. 7A is a diagram of another example of a dispersed storage network directory structure that includes a directory address failsafe mechanism 191, a root directories directory file 198, and a primary root directory file 200. The directory address failsafe mechanism 191 includes a plurality of agents 1-n and a share decoder 221. The root directories directory file 198 includes a file or directory name field 210 and a dispersed storage network (DSN) address field 216. Note that the root directories directory file 198 is accessed via a DSN address 204 (e.g., 3457). The primary root directory file 200 includes a file or directory name field 212 and a DSN address field 218 and is accessed via a DSN address 204 (e.g., 0000).

The share decoder 221 may be implemented as part of a dispersed storage (DS) processing in any one of a user device, a DS processing unit, a DS managing unit, a storage integrity processing unit, and a DS unit. For example, the share decoder 221 may be implemented as a DS processing as part of a DS processing unit to determine the root address of the root directories directory file to enable access to data objects in a DSN memory by utilizing information from a primary or redundant root directory file. The agents 1-n may be implemented as part of a DS processing in any one of a user device, a DS processing unit, a DS managing unit, a storage integrity processing unit, and a DS unit. For example, the agents 1-n may be implemented as a DS processing in a combination of user devices and DS processing units. Each agent 1-n stores a share of a directory address that by itself does not reveal a DSN address of a directory file. A read threshold number of shares will enable the reproduction of the DSN address. For example, the shares are encoded data slices. As another example, the shares are Shamir shared secret shares.

In an example of operation, the share decoder 221 retrieves a threshold number of the encoded components (e.g., shares 1-n) of the directory address (e.g., 3457) from at least some of the plurality of agent modules 1-n and reconstructs a directory address from the threshold number of encoded components 1-n. For example, the share decoder 221 reconstructs a directory address 204 (e.g., 3457) corresponding to the root directories directory file 198. Alternatively, or in addition to, the share decoder 221 produces a directory file DSN address for one or more other directory files (e.g., the primary root directory file 200, and intermediate directory file, and a directory file containing a desired filename). For example, the share decoder 221 produces the root DSN address 206 (e.g., 0000) of the primary root directory file 200. As another example, the share decoder 221 produces a DSN address of 1000 representing a DSN address of another directory file.

The root directories directory file 198 indicates the name of one or more root directories (e.g., primary root directory) and one or more DSN addresses of corresponding root directories (e.g., 0000). For example, the file or directory name field 210 includes the primary root directory name and the DSN address field 216 includes the DSN address of 0000 to link to the primary root directory file 200 by accessing DSN address 0000. The primary root directory file 200 is accessed via DSN address 206 (e.g., 0000) and includes file names or pathnames (e.g., /user, /bin, /home) in the file or directory name field 212 that link via DSN addresses (e.g., 0010, 0020, 0030) in the DSN address field 218 to further directory files or data files.

Figure 7B:
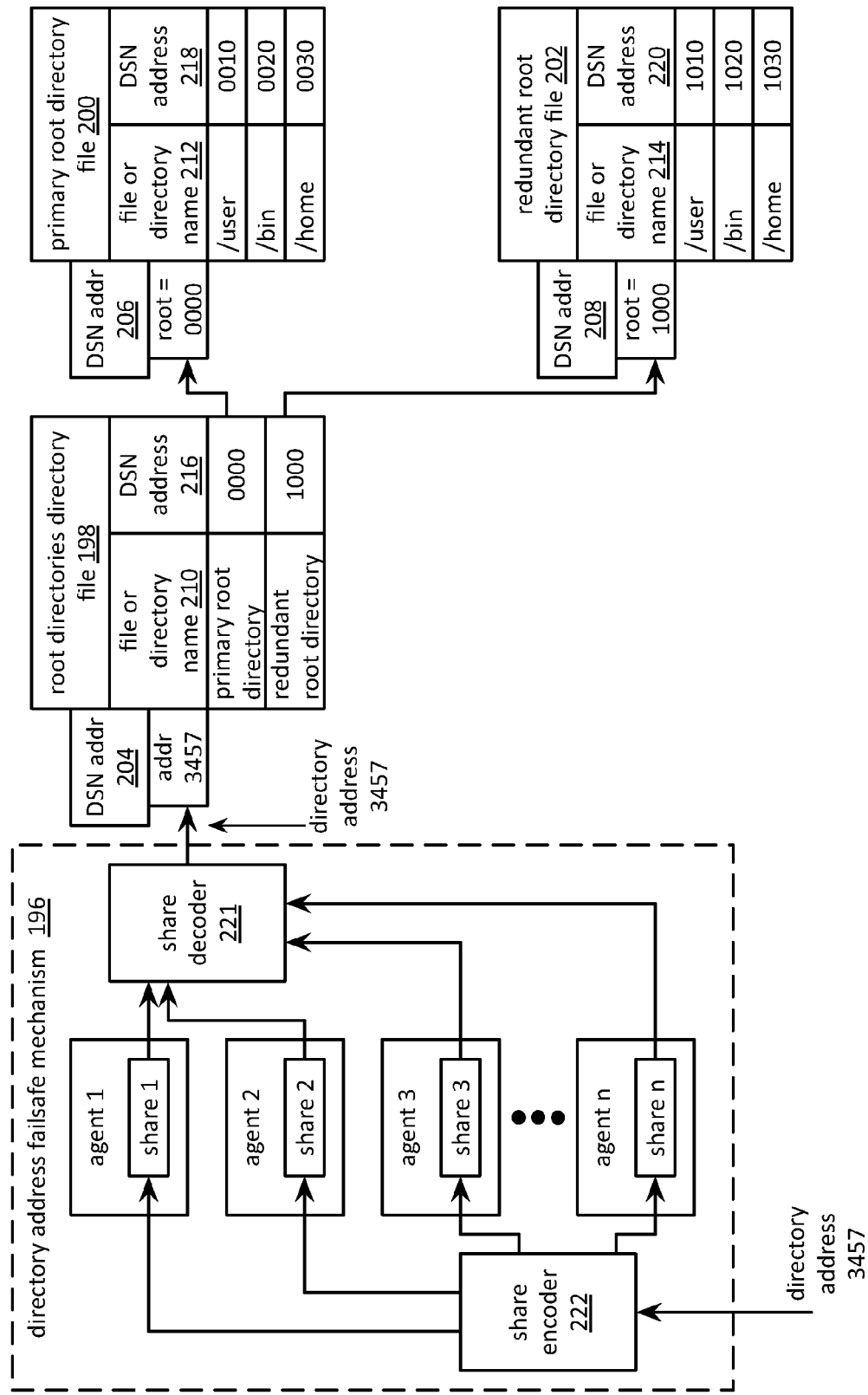
FIG. 7B is a diagram of another example of a dispersed storage network directory structure in accordance with the invention.

FIG. 7B is a diagram of another example of a dispersed storage network directory structure that includes a directory address failsafe mechanism 196, a root directories directory file 198 of FIG. 7A, a primary root directory file 200 of FIG. 7A, and a redundant root directory file 202. The directory address failsafe mechanism 196 includes a plurality of agents 1-n of FIG. 7A, a share decoder 221 of FIG. 7A, and a share encoder 222. The root directories directory file 198 of FIG. 7A includes a file or directory name field 210 and a dispersed storage network (DSN) address field 216. Note that the root directories directory file 198 is accessed via a DSN address 204 (e.g., 3457). The primary root directory file 200 of FIG. 7A includes a file or directory name field 212 and a DSN address field 218 and is accessed via a DSN address 204 (e.g., 0000). The redundant root directory file 202 includes a file or directory name field 214 and a DSN address field 220 and is accessed via a DSN address 208 (e.g., 1000).

The share decoder 221 operates as previously discussed with reference to FIG. 7A. The share encoder 222 may be implemented as part of a dispersed storage (DS) processing in any one of a user device, a DS processing unit, a DS managing unit, a storage integrity processing unit, and a DS unit. For example, the share encoder 222 may be implemented as a DS processing as part of a DS processing unit to encode the root address of the root directories directory file to enable access to data objects in a DSN memory by utilizing information from a primary or redundant root directory file. The agents 1-n operate to receive shares 1-n from the share encoder 222 and to send shares 1-n to the share decoder 221.

In an example of operation, the share encoder 222 receives a directory address of 3457 and dispersed storage error encodes the directory address to produce a plurality of encoded components (e.g., shares 1-n) of the directory address (e.g., 3457). Next, the share encoder 222 transmits the plurality of encoded components of the directory address to a plurality of agent modules 1-n for storage therein. Alternatively, or in addition to, the share encoder 222 produces a directory file DSN address for one or more other directory files (e.g., the primary root directory file 200, the redundant root directory file 202, an intermediate directory file, and a directory file containing a desired filename). For example, the share encoder 222 produces the root DSN address 208 (e.g., 1000) of the redundant root directory file 202.

In retrieval example of operation, the share decoder 221 retrieves a threshold number of the encoded components (e.g., shares 1-n) of the directory address (e.g., 3457) from at least some of the plurality of agent modules 1-n and reconstructs a directory address from the threshold number of encoded components 1-n. For example, the share decoder 221 reconstructs a directory address 204 (e.g., 3457) corresponding to the root directories directory file 198. Note that the root directories directory file 198 indicates the name of one or more root directories (e.g., primary root directory, redundant root directory) and one or more DSN addresses of corresponding root directories (e.g., 0000, 1000). For example, the file or directory name field 210 includes the primary root directory name and the DSN address field 216 includes the DSN address of 0000 to link to the primary root directory file 200 by accessing DSN address 0000. As another example, the file or directory name field 210 includes the redundant root directory name and the DSN address field 216 includes the DSN address of 1000 to link to the redundant root directory file 202 by accessing DSN address 1000.

The redundant root directory file 202 is accessed via DSN address 208 (e.g., 1000) and includes file names or pathnames in the file or directory name field 214, which are identical to the filenames and paths names in the file or directory name field to 12 of the primary root directory file 200. The entries in the file or directory name field 214 link via DSN addresses (e.g., 1010, 1020, 1030) in the DSN address field 220 to further directory files or data files to replicate a directory structure associated with the primary root directory file 200. Note that the DSN addresses in the DSN address field 220 of the redundant root directory file 202 are different than the DSN addresses in the DSN address field 218 of the primary root directory file 200.

The redundant root directory file 202 is used when the primary root directory 200 is unavailable or when one of the directory structures (e.g., file or directory name 210, DSN address 216) associated with the primary root directory file 202 is damaged. The method of operation to utilize the primary or the redundant root directory file structures is discussed in greater detail preference to FIG. 9A.

FIG. 8A is a diagram of another example of a dispersed storage network (DSN) directory structure that includes a primary root directory file 200, an intermediate directory file 150, and a file-level directory file 152. The primary root directory file 200 includes a file or directory name field 212 and a DSN address field 218 as previously discussed with reference to FIG. 7A. Such a primary root directory file 200 provides a start of a directory file structure linking to one or more intermediate directory files 150 and one or more file-level directory files 152. The intermediate directory file 150 includes one or more intermediate directory entries 162 (e.g., file or directory name) and one or more corresponding intermediate directory entry addresses 168 (e.g., a DSN address) for the one or more intermediate directory entries 162. The intermediate directory file 150 is associated with an intermediate directory address 156 (e.g., 0010) to provide access to the intermediate directory file 150 stored in a DSN memory.

The file-level directory file 152 includes one or more file-level directory entries 164 (e.g., a file name such as /user/temp/pic.jpg, /user/temp/picture.jpg) and one or more corresponding file-level directory entry addresses 170 (e.g., 0019, 0100, 0078) to provide access to the one or more file-level directory entries 164. The file-level directory file 152 is associated with a file-level directory address 158 (e.g., 0015), which is a DSN address.

In an example of obtaining a DSN address of a file (e.g., /user/temp/picture.jpg) for file retrieval, the primary root directory file 200 is accessed at DSN root address 206 (e.g., DSN address 0000) by retrieving encoded data slices corresponding to the primary root directory file 200 previously stored in the DSN memory and decoding the slices to produce the primary root directory file 200. The DSN address of the intermediate directory file 150 (e.g., DSN address 0010) is extracted from the DSN address field 218 of the primary root directory file 200 corresponding to a file name portion /user entry of the file or directory name field 212. The intermediate directory file 150 is accessed at the DSN intermediate directory address 156 (e.g., 0010). The DSN address of the file-level directory file 152 (e.g., DSN address 0015) is extracted from the DSN address field 168 of the intermediate directory file 150 corresponding to a file name portion /user/temp entry of the file or directory name field 162. The file-level directory file 152 is accessed at the DSN file-level directory address 158 (e.g., 0015). The DSN address of the file name /user/temp/picture.jpg (e.g., DSN address 0078) is extracted from the DSN address field 170 of the file-level directory file 152 corresponding to a file name /user/temp/picture.jpg entry of the file or directory name field 164. The file name /user/temp/picture.jpg is accessed at the DSN address of 0078) by retrieving encoded data slices corresponding to the file /user/temp/picture.jpg previously stored in the DSN memory and decoding the slices to produce the file /user/temp/picture.jpg.

Figure 8C:
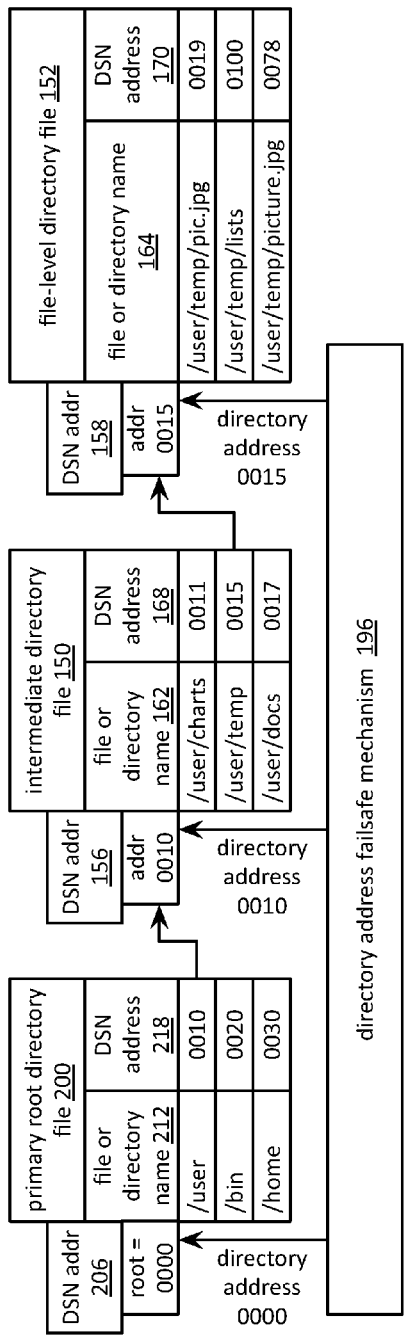
FIG. 8C is a diagram of another example of a dispersed storage network directory structure in accordance with the invention.

The directory structure represented in FIG. 8A is of a primary directory for a vault stored in the DSN memory. If any of the intermediate directory files along the path between the primary root directory file and the address of the data file is missing, corrupted, or unavailable, or if any of the DSN addresses 206, 156, 152 of the directory files are unavailable, then accessing a desired data file stored in the DSN memory may done using a redundant directory structure and/or providing a mechanism to reproduce the DSN addresses of the directory files independent of associated directory file availability. Such structures and/or mechanisms are discussed in greater detail with reference to FIGS. 8B, 8C, and 8D.

FIG. 8B is a diagram of another example of a dispersed storage network (DSN) directory structure where the directory structure provides a redundant directory structure and includes a redundant root directory file 202, and intermediate directory file 174, and a file-level directory file 176. The redundant root directory file 202 includes a file or directory name field 214 and a DSN address field 220, which are the same as the entries of the primary root directory file 200. Such a redundant root directory file 202 provides a start of a redundant directory file structure linking to one or more intermediate directory files 174 and one or more file-level directory files 176.

The intermediate directory file 174 includes one or more intermediate directory entries 186 (e.g., file or directory name) and one or more corresponding intermediate directory entry addresses 192 (e.g., a DSN address) for the one or more intermediate directory entries 186. The intermediate directory file 174 is associated with an intermediate directory address 180 (e.g., 1010) to provide access to the intermediate directory file 174 stored in a DSN memory and includes the same intermediate directory entries 186 as the intermediate directory entries 162 of the intermediate directory file 150.

The file-level directory file 176 includes one or more file-level directory entries 188 (e.g., file or directory name) and one or more corresponding file-level directory entry addresses 194 (e.g., DSN address) providing access to the one or more file-level directory entries 188. The one or more file-level directory entries 188 provide one or more redundant directory entries and are associated with one or more corresponding redundant directory entry addresses 194 for the one or more redundant directory entries 188. The file-level directory file 176 is associated with a file-level directory address

182 (e.g., 1015) providing access to the file-level directory file 176 stored in the DSN memory and includes the same file-level directory entries 188 as the file-level directory entries 164 of the file-level directory file 152. The DSN address field 194 includes DSN addresses of subsequent directory files and/or DSN addresses of files, which are identical to the DSN address entries 170 of the primary root-to-file path. For example, file-level directory file 176 indicates that the file/user/temp/picture.jpg is stored at DSN address 0078 and file-level directory file 152 indicates that the file/user/temp/picture.jpg is stored at DSN address 0078.

In an example of obtaining a DSN address of a file (e.g., /user/temp/picture.jpg) utilizing the redundant directory structure for retrieval, the redundant root directory file 202 is accessed at DSN root address 206 (e.g., DSN address 1000) by retrieving encoded data slices corresponding to the redundant root directory file 202 previously stored in the DSN memory and decoding the slices to produce the redundant root directory file 202. The DSN address of the intermediate directory file 174 (e.g., DSN address 1010) is extracted from the DSN address field 220 of the redundant root directory file 202 corresponding to a file name portion /user entry of the file or directory name field 214.

The intermediate directory file 174 is accessed at the DSN intermediate directory address 180 (e.g., 1010). The DSN address of the file-level directory file 176 (e.g., DSN address 1015) is extracted from the DSN address field 192 of the intermediate directory file 174 corresponding to a file name portion /user/temp entry of the file or directory name field 186. The file-level directory file 176 is accessed at the DSN file-level directory address 182 (e.g., 1015). The DSN address of the file name /user/temp/picture.jpg (e.g., DSN address 0078) is extracted from the DSN address field 194 of the file-level directory file 176 corresponding to a file name /user/temp/picture.jpg entry of the file or directory name field 188. The file name /user/temp/picture.jpg is accessed at the DSN address of 0078) by retrieving encoded data slices corresponding to the file /user/temp/picture.jpg previously stored in the DSN memory and decoding the slices to produce the file /user/temp/picture.jpg.

In the example of FIG. 8B, the directory structure is of a redundant directory for a vault stored in the DSN memory. In another example, one or more redundant directories may be used to provide an access availability improvement to the system when a primary directory is not available. For instance, one or more redundant directories are utilized when the primary directory is not available and/or when one or more redundant directories are not available.

FIG. 8C is a diagram of another example of a dispersed storage network directory structure that includes the primary root directory file 200, the intermediate directory file 150, and the file-level directory file 152 of FIG. 8A and a directory address failsafe mechanism 196 of FIG. 7B. The directory address failsafe mechanism 196 dispersed storage error encodes one or more of a plurality of directory addresses (e.g., a root directory address 206, and intermediate directory address 156, and a file-level directory address 158) to produce one or more sets of a plurality of encoded components and transmits the plurality of encoded components to a plurality of agent modules. For example, a first set of a plurality of encoded components corresponds to a root directory address, a second set of a plurality of encoded components corresponds to an intermediate directory address, and a third set of a plurality of encoded components corresponds to a file-level directory address. For instance, the directory address failsafe mechanism 196 dispersed storage error encodes the intermediate directory address 156 (e.g., DSN address 0010) to produce a plurality of encoded components of the intermediate directory address and transmits the plurality of encoded components of the intermediate directory address 156 to a plurality of agent modules. As another example, a set of a plurality of encoded components corresponds to an aggregate of the root directory address, the intermediate directory address, and the file-level directory address.

The directory address failsafe mechanism 196 reproduces any of the directory addresses by retrieving at least a threshold number of the encoded components from the plurality of agent modules and dispersed storage error decodes the at least the threshold number of encoded components to produce the directory address. The directory address is utilized to access a directory file.

Figure 8D:
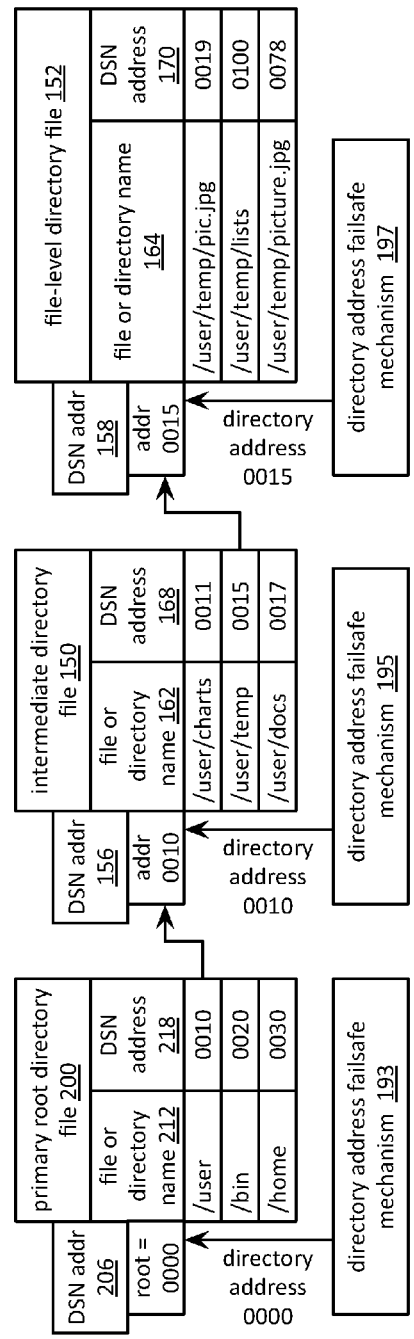
FIG. 8D is a diagram of another example of a dispersed storage network directory structure in accordance with the invention.

FIG. 8D is a diagram of another example of a dispersed storage network directory structure that includes the primary root directory file 200, the intermediate directory file 150, and the file-level directory file 152 of FIG. 8A and a directory address failsafe mechanisms 193, 195, and 197. The directory address failsafe mechanisms 193, 195, and 197 operate as previously discussed with reference to the directory address failsafe mechanism 196 of FIG. 7B to provide a directory address backup for one directory file per directory address failsafe mechanism. The directory address failsafe mechanisms 193, 195, and 197 dispersed storage error encodes a directory addresses (e.g., a root directory address 206, and intermediate directory address 156, and a file-level directory address 158) to produce a plurality of encoded components and transmits the plurality of encoded components to a plurality of agent modules associated with a directory address.

In this example, directory address failsafe mechanism 193 dispersed storage error encodes the primary root directory address to produce a plurality of encoded components of the primary root directory address and transmits the plurality of encoded components of the primary root directory address to a plurality of primary root directory agent modules; Directory address failsafe mechanism 195 dispersed storage error encodes the intermediate directory address to produce a plurality of encoded components of the intermediate directory address and transmits the plurality of encoded components of the intermediate directory address to a plurality of intermediate directory agent modules; and Directory address failsafe mechanism 197 dispersed storage error encodes the file-level directory address to produce a plurality of encoded components of the file-level directory address and transmits the plurality of encoded components of the file-level directory address to a plurality of file-level directory agent modules.

The directory address failsafe mechanisms 193, 195, and 197 reproduces a corresponding one of the directory addresses by retrieving at least a threshold number of the encoded components from the plurality of associated agent modules and dispersed storage error decodes the at least the threshold number of encoded components to produce the directory address. The directory address is utilized to access a corresponding directory file. For example, directory address failsafe mechanism 195 retrieves at least a threshold number of the encoded components of the plurality of encoded components of the intermediate directory address from the plurality of intermediate directory agent modules and dispersed storage error decodes the at least the threshold number of encoded components to reproduce the intermediate directory address (e.g., DSN address 0010).

Figure 9A:
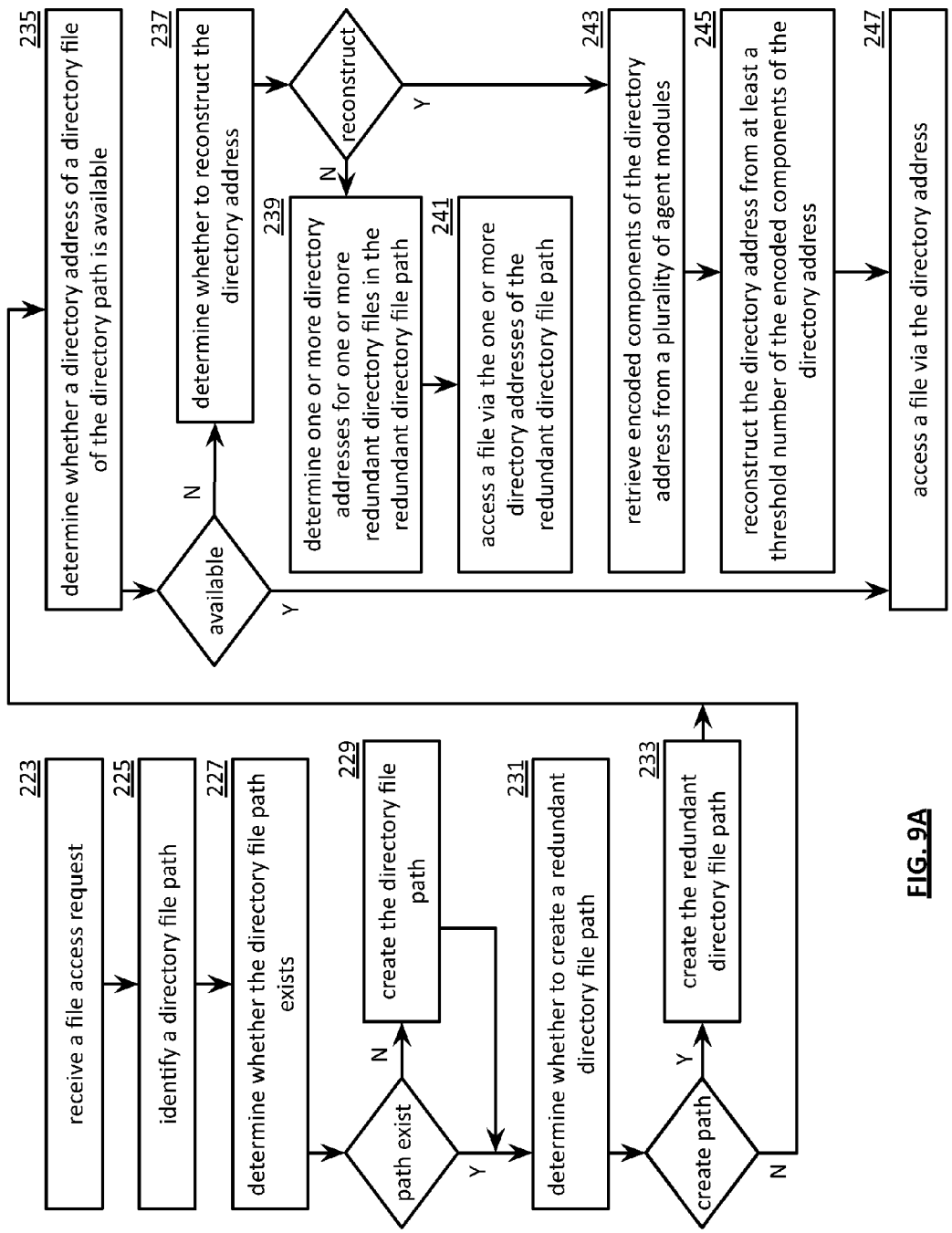
FIG. 9A is a flowchart illustrating an example of accessing directory information in accordance with the invention.

FIG. 9A is a flowchart illustrating an example of accessing directory information where the method begins with step 223 where a processing module receives a file access request. Such a file access request includes one or more of a requester identifier (ID), a data ID, a file name, a directory file path, a block ID, a performance requirement, an access reliability requirement, and an access type. The access type includes at least one of a read data request, a write data request, a list request, a delete request, a modify request, and a replacement request. The method continues at step 225 where the processing module identifies a directory file path based on the file access request. For example, the processing module extracts a directory file path of /user/temp/picture.jpg from the file access request.

The method continues at step 227 where the processing module determines whether the directory file path exists (e.g., it was previously established and stored in a dispersed storage network (DSN) memory). The processing module determines that the directory file path exists when the processing module discovers a memory-based directory file path that compares favorably to the directory file path of the request. For example, the processing module determines that the directory file path exists when the processing module receives a read request for the directory file path of file /user/temp/picture.jpg and accesses the DSN memory to determine that a memory-based directory file path compares favorably to the directory file path to (e.g., exists). As another example, the processing module determines that the directory file path does not exist when the processing module receives a write request for the directory file path of /user/temp/picture.jpg and accesses the DSN memory determine that a memory-based directory file path does not compare favorably to the directory file path (e.g., it does not exist yet). The method branches to step 231 when the processing module determines that the directory file path does not exist. The method continues to step 229 when the processing module determines that the directory file path does not exist. At step 229, the processing module creates the directory file path when the directory file path does not exist.

The method continues at step 231 where the processing module determines whether to create a redundant directory file path. Such a determination may be based on one or more of the performance requirement, the access reliability requirement, the requester ID, and the access type. For example, the processing module determines to create the redundant directory file path when the access reliability requirement indicates that a level of required access reliability is greater than an access reliability threshold. The method branches to step 235 where the processing module determines not to create the redundant directory file path. The method continues to step 233 when the processing module determines to create the redundant directory file path. At step 233, the processing module creates the redundant directory file path.

At step 235 the processing module determines whether a directory address (e.g., a DSN address) of a directory file of the directory file path is available based on accessing the DSN memory; where the directory file includes at least one of a root directory file, an intermediate directory file, and a file-level directory file. The method branches to step 247 when the processing module determines that the directory address is available. The method continues to step 237 when the processing module determines that the directory address is not available. At step 237, the processing module determines whether to reconstruct the directory address or to use a redundant directory file path. Such a determination may be based on one or more of agent module availability, the requester ID, the data ID, the file name, the directory file path, the block ID, the performance requirement, the access reliability requirement, and the access type. For example, the processing module determines to reconstruct the directory address when the agent module availability is favorable (e.g., the agent modules contain shares of the directory address). As another example, the processing module determines to use the redundant directory file path when the performance requirement indicates that low access latency is required.

The method branches to step 243 when the processing module determines to reconstruct the directory address. The method continues to step 239 when the processing module determines to use the redundant directory file path (e.g., to not reconstruct the directory address). At step 239, the processing module determines one or more directory addresses for one or more redundant directory files in the redundant directory file path based on accessing the redundant directory file path from the DSN memory. The method continues at step 241 where the processing module accesses a file via the one or more directory addresses of the redundant directory file path. For example, the processing module retrieves a plurality of sets of encoded data slices from a file DSN address extracted from a directory address of the redundant directory file path and dispersed storage error decodes the plurality of sets of encoded data slices to reproduce the file.

The method continues at step 243 where the processing module retrieves encoded components of the directory address from a plurality of agent modules when reconstructing the directory address. The method continues at step 245 where the processing module reconstructs the directory address from the at least a threshold number of the encoded components of the directory address when at least a threshold number of the encoded components of the directory address have been received. The method continues at step 247 where the processing module accesses the file via the directory address. For example, the processing module retrieves the plurality of sets of encoded data slices from the file DSN address extracted from the directory address and dispersed storage error decodes the plurality of sets of encoded data slices to reproduce the file.

Figure 9B:
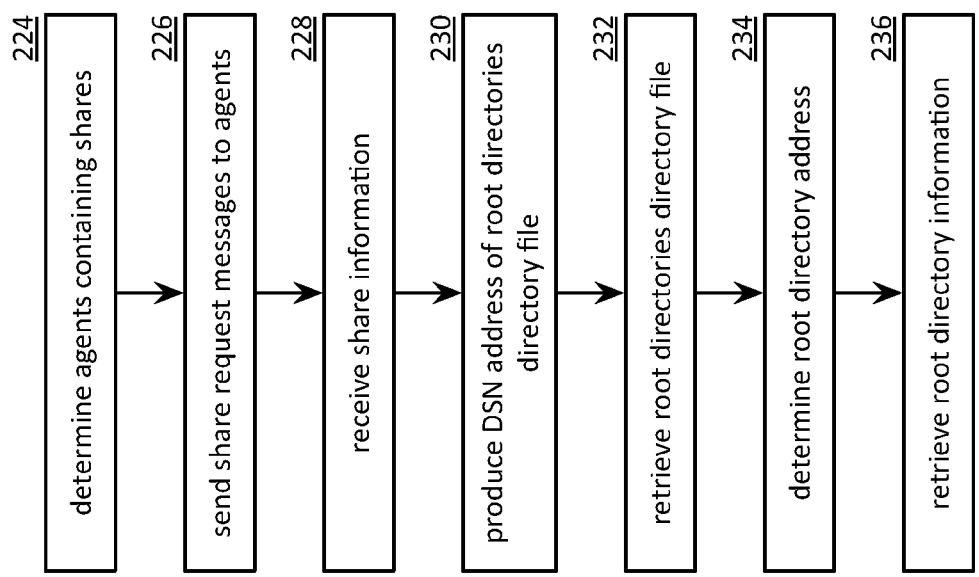
FIG. 9B is a flowchart illustrating an example of retrieving directory information in accordance with the invention.

FIG. 9B is a flowchart illustrating an example of retrieving directory information. The method begins at step 224 where a processing module determines agents containing shares. Such a determination may be based on one or more of: agent entries by a user, a lookup, a predetermination, a query of agents, a command, a message, an email, and a memory device access. For example, the processing module determines agents based on a list of agents contained in a memory of a dispersed storage (DS) processing unit.

The method continues at step 226 where the processing module sends a share request message to at least a read threshold number of the agents where the message includes one or more of a request to send the share associated with the agent back to the DS processing, a user identifier (ID), a vault ID, a data object name, a source name, a slice name, and a root directory file name. The method continues at step 228 where the processing module receives share information from one or more agents in response to the share request message. Note that the shares may include an encoded data slice and/or a Shamir share of a shared secret.

The method continues at step 230 where the processing module determines operational parameters (e.g., dispersed storage error coding parameters) to enable decoding the shares. Such a determination may be based on one or more of a user ID, a vault ID, a vault lookup, a message, a command, a predetermination, a data object name, a source name, a slice name, and a root directory file name. Next, the processing module de-slices and decodes at least a read threshold number of shares in accordance with the operational parameters to produce a dispersed storage network (DSN) address of a root directories directory file when a share format is encoded data slices. Alternatively, the processing module decodes at least a read threshold number of shares in accordance with the operational parameters to produce the DSN address of the root directories directory file when the share format is shares of a shared secret.

The method continues at step 232 where the processing module retrieves the root directories directory file based on the DSN address of the root directories directory file. For example, the processing module converts the DSN address of the root directories directory file into slice names. Next, the processing module determines physical storage locations of the encoded data slices of the root directories directory file based on the slice names and a lookup in a DSN address to physical location table. The processing module determines operational parameters of the root directories directory file based on a vault ID associated with the root directories directory file and a vault lookup. The processing module sends retrieve slice commands to DS units and receives encoded data slices in response. The processing module de-slices and decodes the encoded data slices in accordance with the operational parameters of the root directories directory file to produce the data segments of the root directories directory file. The processing module aggregates the data segments to produce the root directories directory file. Note that the processing module may temporarily cache the root directories directory in a local memory.

The method continues at step 234 where the processing module determines a root directory address of a desired root directory (e.g., a primary root directory and/or a redundant root directory) based on one or more of the contents of the root directories directory file, what may have already failed in a previous directory retrieval attempt, and what directory file has not been tried so far. For example, the processing module tries the redundant root directory file when the primary root directory file is not available. As another example, the processing module tries a second redundant root directory file when a first redundant root directory file is not available.

The method continues at step 236 where the processing module retrieves root directory information based on accessing the DSN memory at a DSN address of the desired root directory. For example, the processing module converts the DSN address of the root directory file into slice names. The processing module determines physical locations of encoded data slices of the root directory file based on the slice names and a lookup in the DSN address to physical location table. The processing module determines operational parameters of the root directory file based on a vault ID associated with the root directory file and a vault lookup. The processing module sends retrieve slice commands to the DS units and receives encoded data slices in response. The processing module de-slices and decodes the encoded data slices from at least a read threshold number of pillars in accordance with the operational parameters of the root directory file to produce data segments of the root directory file. The processing module aggregates the data segments to reproduce the root directory file. The process repeats as the processing module retrieves further linked directory files from the root directory file until the desired DSN address is determined corresponding to a path name of a desired data object. Note that the processing module may temporarily cache the root directory file and a directory structure associated with the root directory file in a local memory.

Figure 10:
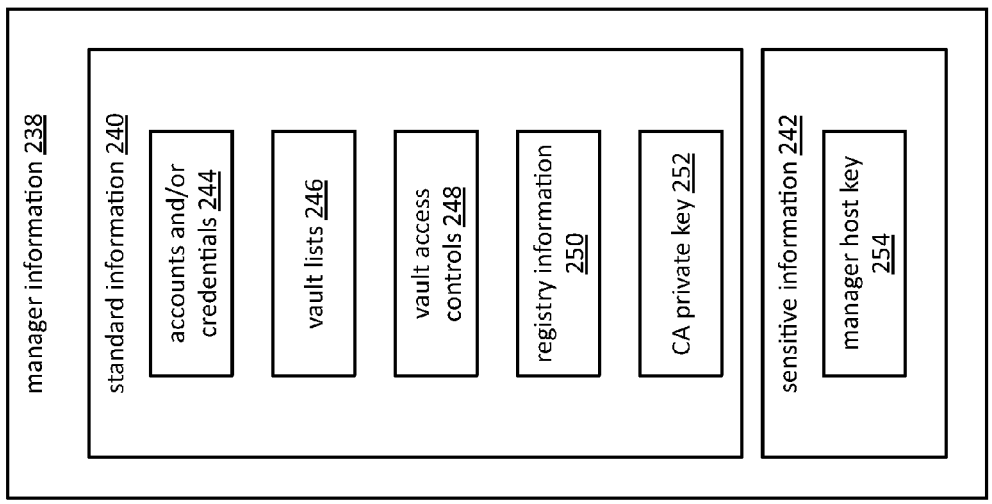
FIG. 10 is a diagram illustrating an example of manager information structure in accordance with the invention.

FIG. 10 is a diagram illustrating an example of manager information structure 238 that includes information created and subsequently utilized by a dispersed storage (DS) managing unit to organize the information used to facilitate operation of a dispersed storage network (DSN) system. The manager information 238 includes standard information 240 and sensitive information 242, wherein sensitive information 242 includes information associated with accessing a vast portion of data contained in the DSN system and wherein the standard information 240 is utilized to gain access to lesser portions of the data contained in the DSN system.

The DS managing unit has access to the manager information 238 and should be available to provide the manager information 238 to the DS managing unit when needed. To ensure that a DS managing unit is available, a new DS managing unit is activated when a current DS managing unit fails. Such an activation of the new DS managing unit includes recovering and installing the manager information 238 such that the new DS managing unit can take over the functions of the DS managing unit.

The standard information 238 includes one or more of accounts and/or credentials 244, vault lists 246, vault access controls 248, registry information 250, and certificate authority private key information 252. The accounts and/or credentials 244 include a list of user identifiers (IDs) and/or authorization levels for various available functions within the DSN system; the vault lists 246 includes vault ID's and/or corresponding user IDs associated with vaults within the DSN system; the vault access controls 248 lists user IDs and/or user groups that are authorized to access specific vaults; the registry information 250 includes a list of file directories and/or lists of units and functions associated with the DSN system; and the certificate authority (CA) private key 252 includes one or more encryption keys utilized to decrypt encrypted messages sent to the DS managing unit, one or more keys utilized to encrypt messages that the DS managing unit sends to other units and/or functions of the DSN system, and may include received certificates from a certificate authority that authorized the DS managing unit and other units of the system to exchange information in confidence. The sensitive information 242 includes one or more manager host keys 254. Such a manager host key 254 is utilized to access at least a portion of the manager information and/or to execute functions of the DS managing unit.

In an operational scenario example, a first DS managing unit stores a redundant copy of the standard information 240 as a first set of encoded data slices in the DSN memory and stores a redundant copy of the sensitive information 242 as a second set of encoded data slices in the DSN memory. Next, a second DS managing unit is activated when the first DSN managing unit fails. The second DS managing unit contacts a plurality of agents to retrieve shares of a secret share to decode a DSN address leading to the second set of encoded data slices that contains the manager host key 254. The second DS managing unit determines the manager host key 254 based on retrieving the second set of encoded data slices. The second DS managing unit retrieves the first set of encoded data slices from the DSN memory to recover the redundant copy of the standard information 240. The second DS managing unit becomes fully operational as an operating DS managing unit of the system when the standard information 240 has been successfully loaded. A method to store and retrieve a copy of the manager host key 254 is discussed in greater detail with reference to FIG. 12-13.

In addition to, or in the alternative of, sharing secret shares of the manager information, it may be redundantly stored in portions and in a distributed fashion in the DSN memory. In this instance, if a portion of the manager information 238 is not readily available, a redundant copy of the portion of the manager information 238 may be retrieved and used.

As an alternative to redundantly storing all of the manager information 238, the DS managing unit stores a redundant copy of the standard information 240 in the DSN memory but not a redundant copy of the sensitive information 242 to provide a balance between reliability and security of the manager information. In an operational scenario example, a first DS managing unit stores a redundant copy of the standard information 240 as encoded data slices in the DSN memory but not of the sensitive information 242. A second DS managing unit is activated when the first DSN managing unit fails. A manager host key is entered into the second DS managing unit enabling the second DS managing unit to access the redundant copy of the standard information 242 from the DSN memory. The second DS managing unit becomes fully operational as the DSN managing unit of the system when the standard information 240 has been successfully loaded. A method to store the standard information is discussed in greater detail with reference to FIG. 11.

Figure 11:
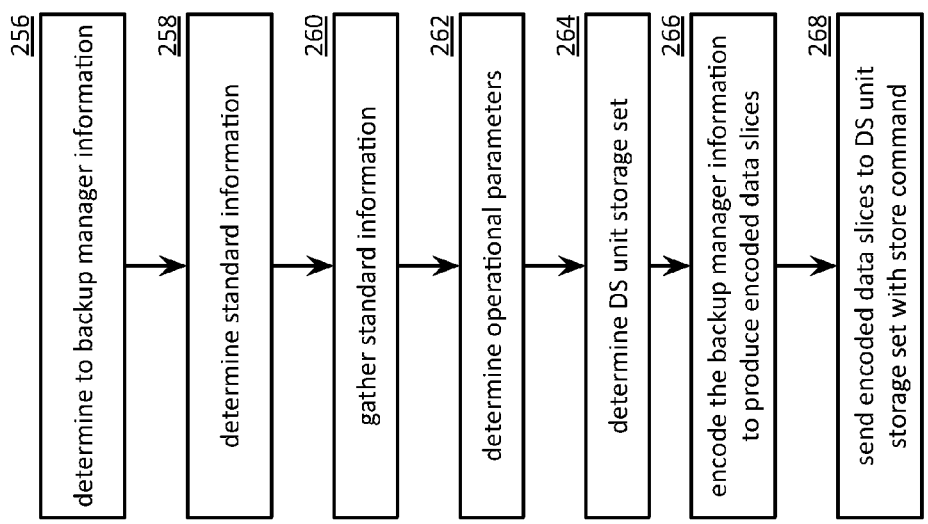
FIG. 11 is a flowchart illustrating an example of storing manager information in accordance with the invention.

FIG. 11 is a flowchart illustrating an example of storing manager information. A method begins with step 256 where a processing module determines to backup manager information. Such a determination may be based on one or more of a schedule, a command, a predetermination, a list, a message, elapsed time since the last backup, a change indicator, a dispersed storage network (DSN) memory status indicator, and a new dispersed storage (DS) managing unit activation indicator. For example, the processing module determines to backup the manager information when a change in the manager information is detected as indicated by a change indicator.

The method continues at step 258 where the processing module determines standard information of the manager information. Such a determination may be based on one or more of a command, a predetermination, a list, a message, a command, elapsed time since the last backup, a change indicator, a DSN memory status indicator, a new DS managing unit activation indicator and a security indicator. For example, the processing module determines the standard information as a list of items from local memory as illustrated in FIG. 10.

The method continues at step 260 where the processing module gathers the standard information from one or more of DS managing unit local memory, DSN memory, a storage integrity processing unit, a user device, a DS processing unit, and a DS unit. The method continues at step 262 where the processing module determines operational parameters (e.g., dispersed storage error coding parameters) based on one or more of a DS managing unit identifier (ID), a vault lookup, a list, a command, a message, and a predetermination. The method continues at step 264 where the processing module determines a DS unit storage set, which contains the DS units that will be utilized to store the pillars of encoded data slices of a backup copy of the standard information. Such a determination may be based on one or more of a vault lookup, a DS managing unit ID, a list, a command, a message, a predetermination, the operational parameters, and a DSN memory status indicator.

The method continues at step 266 where the processing module dispersed storage error and codes the standard information in accordance with the operational parameters to produce encoded data slices of the standard information. The method continues at step 268 where the processing module sends the encoded data slices to the DS unit storage set with a store command such that the DS units of the DS unit storage set store the encoded data slices in the memory of the DS units in response to the store command.

In an example of a subsequent standard information retrieval method, the processing module receives a restore manager information command and a manager host key from one or more of a user input, a user device, a DS processing unit, a storage integrity processing unit, a DS managing unit, and a DS unit. The processing module determines the DS unit storage set based in part on a manager ID, a manager vault ID, and a vault lookup. The processing module sends a retrieve slice command to the DS units of the DS unit storage set. The processing module receives encoded data slices in response to the retrieval commands and re-creates the standard information in accordance with operational parameters for the manager information. The processing module stores the manager information in the memory of the DS managing unit where it may be utilized in subsequent operations of the DS managing unit.

Figure 12:
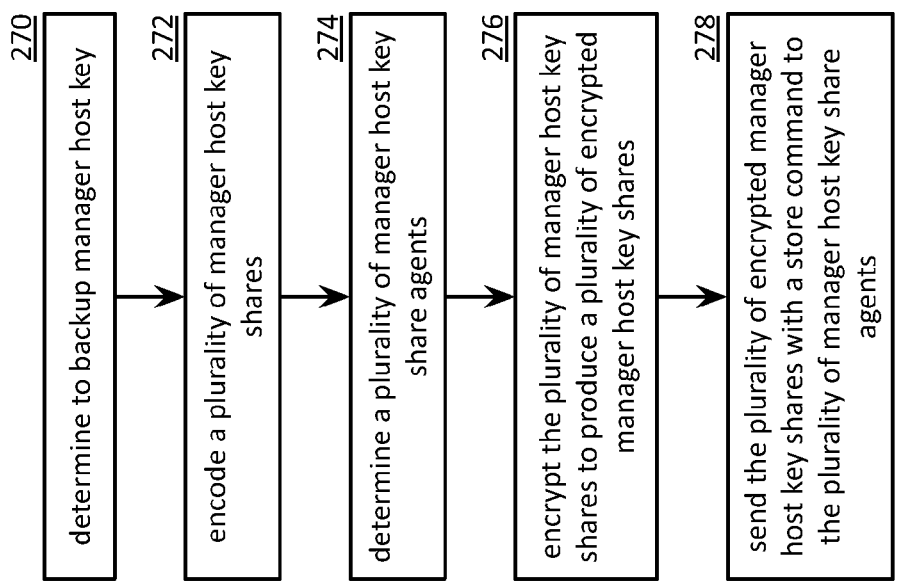
FIG. 12 is a flowchart illustrating an example of storing a manager host key in accordance with the invention.

FIG. 12 is a flowchart illustrating an example of storing a manager host key. A method begins with step 270 where a processing module determines to backup the manager host key. Such a determination may be based on one or more of a schedule, a command, a predetermination, a list, a message, elapsed time since the last backup, a change indicator, a dispersed storage network (DSN) memory status indicator, and a new dispersed storage (DS) managing unit activation indicator. For example, the processing module determines to backup the manager host key when the processing module determines that the elapsed time since the last backup of the manager key exceeds a threshold.

The method continues at step 272 where the processing module encodes the manager host key to produce a plurality of manager host key shares based in part on at least one of but not limited to the manager host key and a share method. Note that the share method may include one or more of a Shamir secret share method (e.g., creating shares with an associated decode threshold) and/or distributed storage method (e.g., creating encoded data slices with an associated decode threshold). Further note that a property of the share method includes re-creation of the original manager host key only when a decode threshold number of shares are available. As such, a share by itself does not contain enough information to determine the manager host key.

The method continues at step 274 where the processing module determines a plurality of manager host key share agents where shares will be subsequently stored based on one or more of a vault lookup, a DS managing unit identifier (ID), a list, a command, a message, a predetermination, a query of candidate share agents, and share agent availability information. Note that the agents may include another processing module implemented in one or more of a user device, the DS processing unit, a storage integrity processing unit, a DS managing unit, and a DS unit. For example, the processing module determines the plurality of manager host key share agents to be a plurality of user devices. As another example, the processing module determines the plurality of manager host key share agents to include user devices and DS processing units.

The method continues at step 276 where the processing module encrypts the plurality of manager host key shares to produce a plurality of encrypted manager host key shares in accordance with one or more of a public key associated with each of the plurality of manager host key share agents, a secret key, a private key, a public key, and/or operational parameters. Note that the key may be associated with the host key share agent. For example, a share is uniquely encrypted with the public key associated with an agent 2 that the encrypted share will be sent to for storage.

The method continues at step 278 where the processing module sends the plurality of encrypted manager host key shares with a store command to the plurality of manager host key share agents to store the plurality of encrypted manager host key shares. For example, the processing module sends the manager host key shares utilizing an email scheme where target email addresses are associated with the manager host key share agents.

As yet another operational example, the manager host key agent receives the encrypted share and decrypts the encrypted share in accordance with a private key associated with a public/private key pair of the manager host key agent where the public key was previously utilized to encrypt the share to produce the encrypted share. The host key agent stores the share in memory and subsequently retrieves the share from memory, encrypts the share to produce an encrypted share, and send the encrypted share to a processing module in response to receiving a manager host key share request from the processing module.

In a further operational example, the manager host key agent receives the encrypted share and stores the encrypted share in memory. The host key agent subsequently retrieves the encrypted share from memory, decrypts the encrypted share in accordance with a private key associated with a public/private key pair of the manager host key agent where the public key was previously utilized to encrypt the share to produce the encrypted share, encrypts the share to produce an encrypted share, and sends the encrypted share to a processing module in response to receiving a manager host key share request from the processing module.

Figure 13:
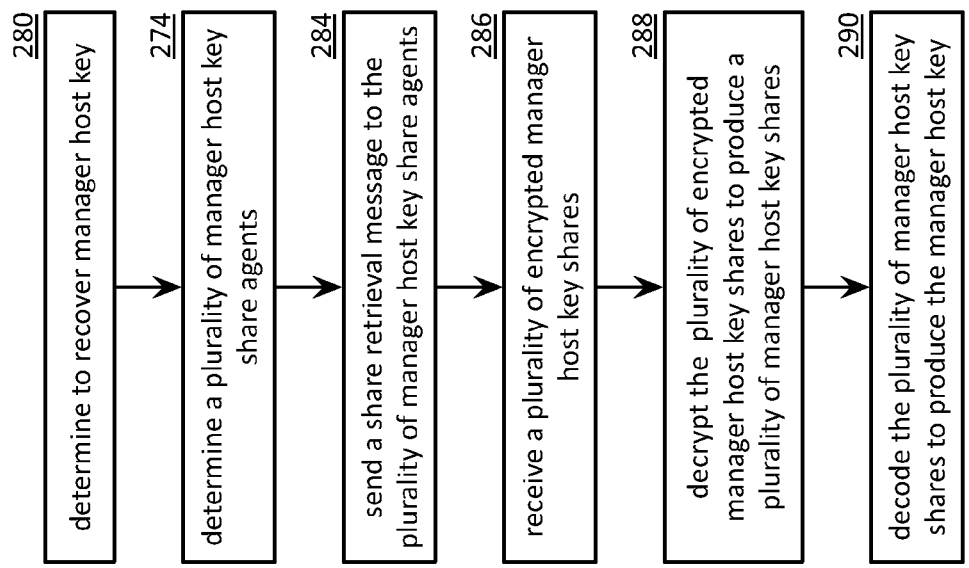
FIG. 13 is a flowchart illustrating an example of retrieving a manager host key in accordance with the invention.

FIG. 13 is a flowchart illustrating an example of retrieving a manager host key. A method begins with step 280 where a processing module determines to recover the manager host key. Such a determination may be based on one or more of a schedule, a command, a predetermination, a list, a message, elapsed time since the last backup, elapsed time as the last recovery, a change indicator, a dispersed storage network (DSN) memory status indicator, an error message, and a new dispersed storage (DS) managing unit activation indicator. For example, the processing module determines to restore the manager host key when the processing module determines that a new DS managing unit is active based on the new DS managing unit activation indicator.

The method continues at step 274 (as described in FIG. 12) and continues at step 284 where the processing module sends a share retrieval message to a plurality of manager host key share agents to retrieve a plurality of encrypted manager host key shares. For example, the processing module sends the retrieval message to the agents within an email message. The manager host key share agents retrieve the manager host key shares from the memory of the manager host key share agents, encrypt the manager host key shares in accordance with an encryption method associated with the processing module (e.g., a public key of a public/private key pair associated with the processing module), and send the encrypted host key shares to the processing module. In an instance, the agent sends send the response message to the processing module within an email message.

The method continues at step 286 where the processing module receives a plurality of encrypted manager host key shares from the manager host key share agents in response to the share retrieval messages. Note that at least a decode threshold number of shares are required to re-create the manager host key. The method continues at step 288 where the processing module decrypts the plurality of encrypted manager host key shares to produce a plurality of manager host key shares in accordance with one or more of a private key associated with the DS managing unit, a key associated with each of the plurality of manager host key share agents, a secret key, a private key, and a public key. For example, the processing module decrypts the encrypted host key share utilizing a private key of a private/public key pair of the processing module and/or the DS managing unit.

The method continues at step 290 where the processing module decodes the plurality of manager host key shares utilizing at least a read threshold number of shares to produce the manager host key in accordance with one or more of a share method, a manager ID, a vault ID, operational parameters, a vault lookup, a command, a message, and a predetermination. Note that the processing module may store the manager host key in local memory associated with the processing module and/or the DS managing unit.

Figure 14:
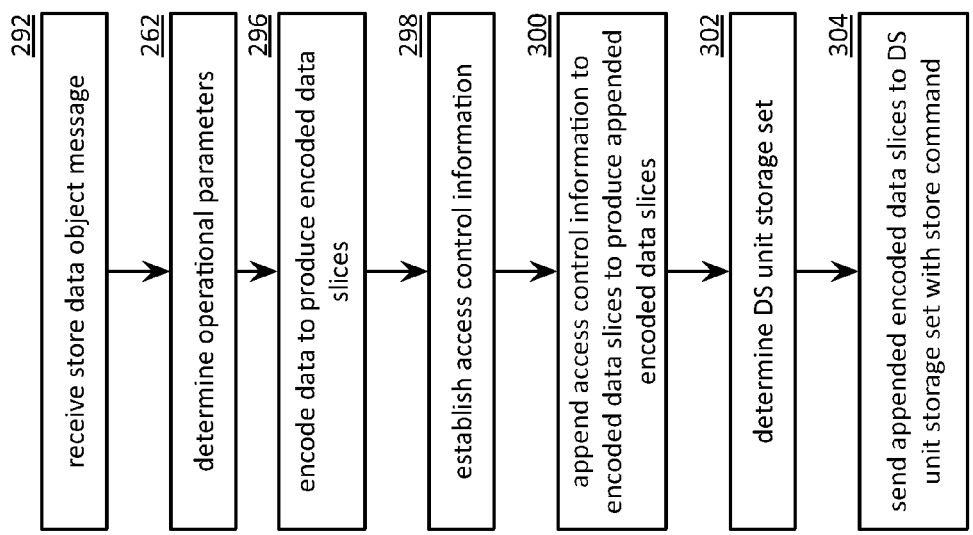
FIG. 14 is a flowchart illustrating an example of associating access control information with an encoded data slice in accordance with the invention.

FIG. 14 is a flowchart illustrating an example of associating access control information with an encoded data slice. The method begins at step 292 where a processing module receives a data storage request that includes data. Such a data storage request message may include one or more of a user identifier (ID), data, a data object name, a data type, a data object, input access control information, a priority indicator, a security indicator, and a performance indicator. The method continues with step 262 of FIG. 11 and then at step 296 where the processing module dispersed storage error encodes the data in accordance with the dispersed storage error encoding parameters to produce a set of encoded data slices.

The method continues at step 298 where the processing module establishes access control information for each encoded data slice of the set encoded data slices in accordance with the dispersed storage error encoding parameters to produce a set of access control information (i.e., each slice has its own access control information). The access control information includes at least one of: a requester ID allowed to access the data, a requester ID disallowed to access the data, a requester ID allowed to access an encoded data slice of the set of encoded data slices associated with an allowed slice name, a requester ID disallowed to access the encoded data slice of the set of encoded data slices associated with a disallowed slice name, and an access type indicator (e.g., read, store, replace, modify, delete, list, rebuild).

The processing module may establish the set of access control information by extracting the set of access control information from the data storage request and/or retrieving the set of access control information based on at least one of a data ID, a user device ID, a data type, an analysis of the data, a priority indicator, a security indicator, a performance indicator, a vault lookup, a list, a command, a message, and a predetermination. Alternatively, or in addition to, the processing module may query a dispersed storage (DS) managing unit based on the data ID and the user device ID to retrieve the set of access control information.

From a set perspective, the access control information grants access to one or more specific requesting units to at least a decode threshold number of encoded data slices; denies access to one or more specific requesting units for at least a pillar width number minus the decode threshold number of encoded data slices; grants access to a specific requesting code for at least the decode threshold number of encoded data slices; grants read-only access to one or more specific requesting units for at least the decode threshold number of encoded data slices. For example, the DS processing determines the access control information to include an indicator that the user ID 754 is authorized to access the slice name 5396 for the purpose of reading the slice but not for the purposes of modification or deletion.

The method continues at step 300 where the processing module appends a corresponding one of the set of access control information to one of the set of encoded data slices to produce a set of appended slices (e.g., each data slice has appended thereto its own access control information). The processing module may append the access control information to the beginning of an encoded data slice; to the end of the encoded data slice; or by embedding the access control information within the encoded data slice.

The method continues at step 302 where the processing module determines a set of DS units. Such a determination may be based on one or more of a user ID, a vault ID, a vault lookup, a list, a command, a message, a predetermination, the dispersed storage error encoding parameters, the set of appended slices, the access control information, and a dispersed storage network (DSN) memory status indicator. The method continues at step 304 where the processing module outputs the set of appended slices to the set of DS units.

Figure 15:
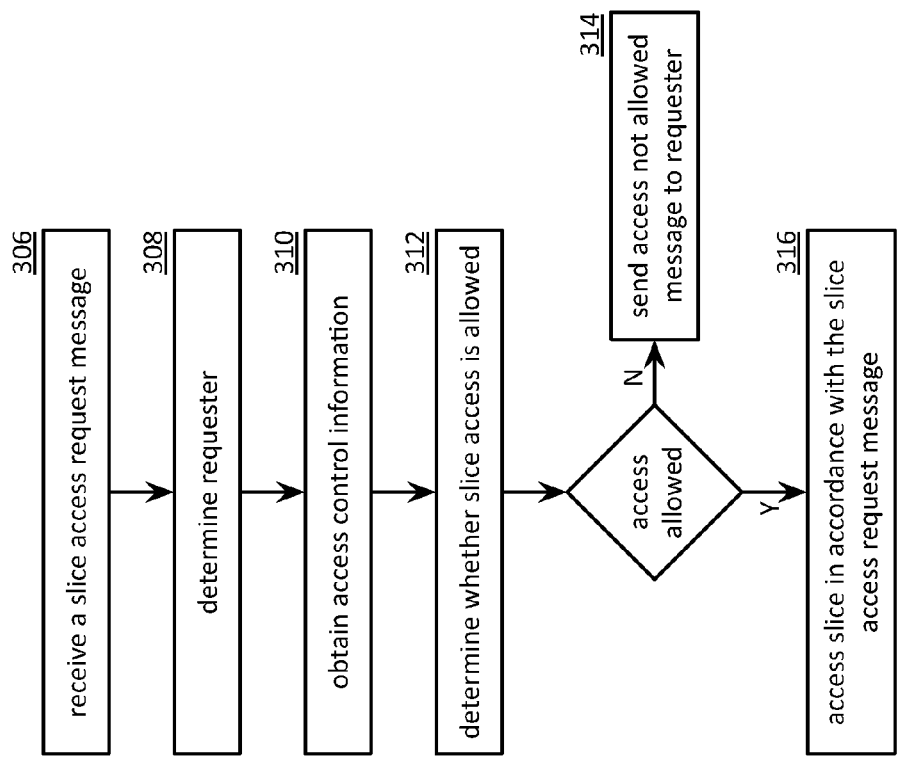
FIG. 15 is a flowchart illustrating an example of authenticating an encoded data slice access request in accordance with the invention.

FIG. 15 is a flowchart illustrating an example of authenticating an encoded data slice access request. The method begins with step 306 where a processing module receives a slice access request message. Note that the access slice access request message may include one or more of a slice name, a type of access request (e.g., read, store, replace, modify, delete, list, rebuild), a requester identifier (ID), a slice name range, a source name, a dispersed storage network (DSN) virtual address, a user ID, a requester ID, a data object name, a data type, input access control information, a priority indicator, a security indicator, and a performance indicator. The method continues at step 308 where the processing module determines a requester based on one or more of information in the slice access request message (e.g., a requester ID), a lookup, a command, a message, a predetermination, and a list.

The method continues at step 310 where the processing module obtains access control information based on at least one of the slice name and the requestor ID. Such obtaining of the access control information includes at least one of retrieving the access control information from a memory based on the slice name and sending an access control information request message to a dispersed storage (DS) managing unit, wherein the access control information request message includes the slice name, and receiving an access control information response message, wherein the access control information response message includes the access control information. For example the processing module determines a location of the access control information based on a lookup of a local virtual DSN address to physical location table. Next, the processing module retrieves the access control information from a memory of a DS unit at the location of the access control information.

The method continues at step 312 where the processing module determines whether the slice access request message is allowable based on the access control information. Such a determination includes at least one of determining that the requester ID is allowed access to the encoded data slice, determining that the requester ID is not allowed access to the encoded data slice, determining that the requester ID is allowed access to the encoded data slice for the type of access request, and determining that the requester ID is not allowed access to the encoded data slice for the type of access request. For example, the processing module determines the slice access request message is allowable when the access control information includes an indicator that user ID 754 is authorized to access slice name 5396 for the purpose of reading the slice but not for the purposes of modification or deletion and the slice access request message includes user ID 754 requesting a read type of access request to read an encoded data slice with a slice name 5396. As another example, the processing module determines the slice access request message is not allowable when the access control information includes an indicator that the user ID 754 is authorized to access the slice name 5396 for the purpose of reading the slice but not for the purposes of modification or deletion and the slice request message includes user ID 754 requesting a delete type of access request of the encoded data slice with the slice name 5396.

The method branches to step 316 when the processing module determines that the slice access request message is allowable. The method continues to step 314 when the processing module determines that the slice access request message is not allowable. The method continues at step 314 where the processing module outputs a slice access denial response message. For example, the processing module sends the slice access denial response message to a DS managing unit when the processing module determines that the slice access request message is not allowable.

The method continues at step 316 where the processing module accesses an encoded data slice of a set of encoded data slices in accordance with the slice access request message when the slice access request message is allowable. Such accessing of the encoded data slice of the set of encoded data slices comprises at least one of retrieving the encoded data slice based on the slice name and outputting the encoded data slice, extracting a replacement slice from the slice access request message and replacing the encoded data slice affiliated with the slice name with the replacement slice, extracting the encoded data slice from the slice access request message and storing the encoded data slice (e.g., replacing, updating), deleting the encoded data slice based on the slice name, and retrieving slice attributes associated with the encoded data slice based on the slice name and outputting the slice attributes. For example, the processing module retrieves an encoded data slice with a slice name 5396 and outputs the encoded data slice to a requester when the slice access message is allowable.

Figure 16:
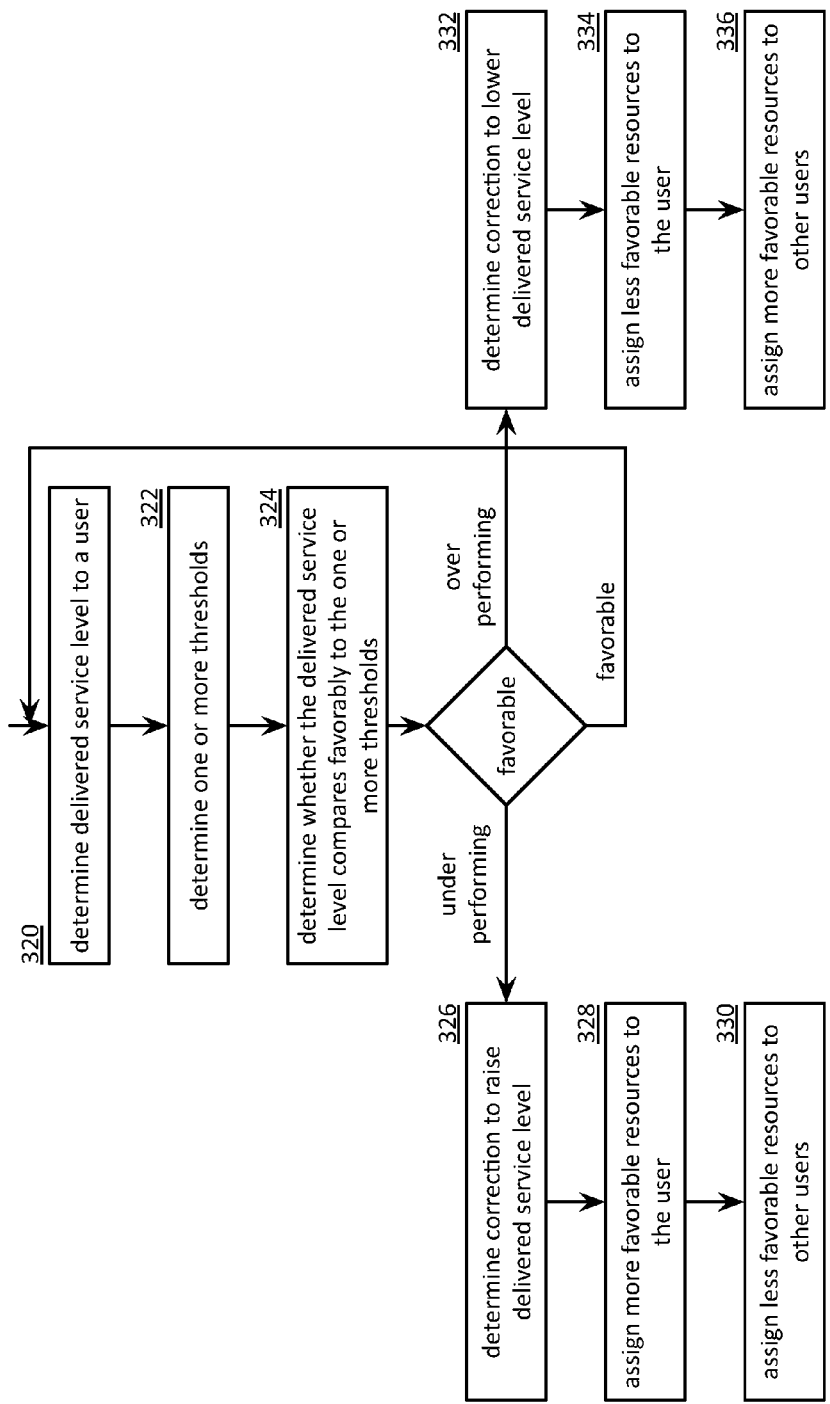
FIG. 16 is a flowchart illustrating an example of modifying a delivered service level in accordance with the invention.
Figure 17:
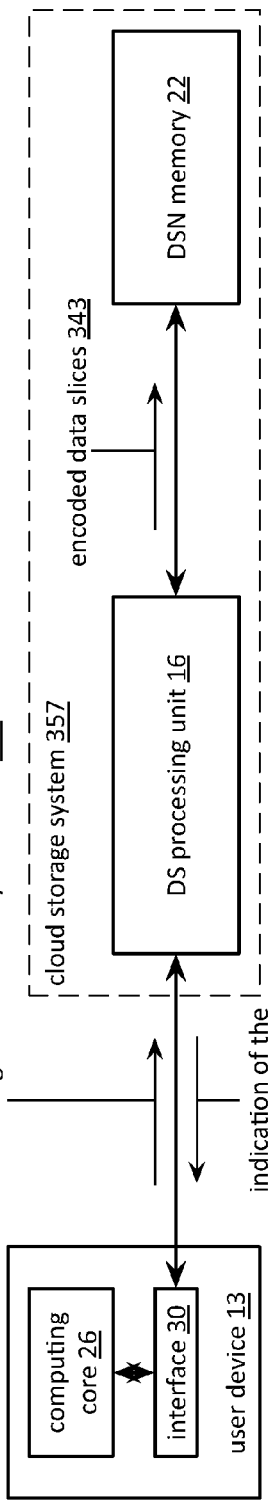
FIG. 17A is a schematic block diagram of another embodiment of a computing system in accordance with the invention.
FIG. 17B is a diagram of a reliability pulldown menu in accordance with the invention.

FIG. 16 is a flowchart illustrating an example of modifying a delivered service level. A processing module determines a delivered service level provided to at least one user identifier (ID) and/or user device and modifies parameters of a dispersed storage network (DSN) system to affect a future delivered service level based in part on the delivered service level. Such a service level may include one or more of access latency, access bandwidth, available storage, actual utilized storage, system availability, system reliability, and security performance (e.g., intrusions, corrupted information, hacked information, etc.) The processing module may be implemented in one or more of a dispersed storage (DS) managing unit, a user device, a DS processing unit, a storage integrity processing unit, and a DS unit.

The method begins at step 320 where the processing module determines a delivered service level to at least the user identifier (ID) and/or user device based on one or more of a query, a message, a user ID, a user device ID, a measurement, a list, a performance analysis, a historical record, and the error message, and a transaction record. Note that the processing module may determine which user and/or user device to determine the service level for based on one or more of a command, a list, a message, a recent transaction, an error message, and the last user ID that was examined. For example, the processing module determines to examine the next user ID and a list.

The method continues at step 322 where the processing module determines one or more thresholds for comparison to of the delivered service level. Such a determination may be based on one or more of a user ID, a user device ID, a vault ID, a vault lookup, a list, a predetermination, a command, a message, and a DSN memory status indicator. The method continues at step 324 where the processing module determines whether the delivered service level compares favorably to the one or more thresholds. Such a determination may be based on one or more of the delivered service level, the thresholds, a comparison of the delivered service level to the thresholds, a command, a message, and a DSN memory status indicator. Note that the processing module determines that the outcome is unfavorable when the DSN system is over performing or underperforming with respect to service level expectations of a user as indicated by thresholds associated with the user. For example, the processing module determines that the DSN system is underperforming when the processing module determines that the access latency performance is greater than an access latency performance threshold (e.g., too slow). As another example, the processing module determines that the DSN system is over performing when the access latency performance is less than the access latency performance threshold (e.g., too fast). Note that the processing module determines a favorable comparison when the DSN system is performing within a desired range of thresholds.

The method repeats back to step 320 when the processing module determines that the delivered service level compares favorably to the one or more thresholds. The method branches to step 332 when the processing module determines that the delivered service level does not compare favorably to the one or more thresholds and the DSN system is over performing. The method continues to step 326 when the processing module determines that the delivered service level does not compare favorably to the one or more thresholds and the DSN system is underperforming.

The method continues at step 326 where the processing module determines a correction to raise the delivered service level based on one or more of the delivered service level, the thresholds, a comparison of the delivered service level to the thresholds, a command, a message, a DSN memory status indicator, and a correction history. Such a correction may include assigning more favorable resources to the user for future activities to improve performance and may include assigning less favorable resources to other users which may indirectly improve the performance to the user (e.g., the DSN system is less burdened with the other users and may provide better service to the user). Nothing continues at step 328 where the processing module assigns more favorable resources to the user where the more favorable resources may include one or more of more DS processing units, different DS processing units with lower access latency and/or with more capacity, more DS units, and different DS units with lower access latency and/or with more capacity. The method continues at step 330 where the processing module assigns less favorable resources to other users wherein the less favorable resources may include one or more of fewer DS processing units, different DS processing units with higher access latency and/or with less capacity, fewer DS units, and different DS units with higher access latency and/or with less capacity.

The method continues at step 332 where the processing module determines a correction to lower the delivered service level based on one or more of the delivered service level, the thresholds, a comparison of the delivered service level to the thresholds, a command, a message, a DSN memory status indicator, and a correction history. Such a correction may include assigning less favorable resources to the user for future activities to lower the performance and may include assigning more favorable resources to other users which may indirectly lower the performance to the user (e.g., the DSN system is more burdened with the other users and may provide lowered service to the user).

The method continues at step 334 where the processing module assigns less favorable resources to the user where the less favorable resources may include one or more of fewer DS processing units, different DS processing units with higher access latency and/or with less capacity, fewer DS units, and different DS units with higher access latency and/or with less capacity. The method continues at step 336 where the processing module assigns more favorable resources to other users where the more favorable resources may include one or more of more DS processing units, different DS processing units with lower access latency and/or with more capacity, more DS units, and different DS units with lower access latency and/or with more capacity.

FIG. 17A is a schematic block diagram of another embodiment of a computing system that includes a user device 13 and a cloud storage system 357. The user device 13 includes a computing core 26 and an interface 30. The cloud storage system 357 includes a dispersed storage (DS) processing unit 16 and a dispersed storage network (DSN) memory 22.

In an example of operation, the user device 13 sends a data file 38 and a data storage request 337 to the cloud storage system 357. In addition, user device 13 specifies reliability factors, which include a cloud storage access reliability indication 339 and a cloud storage data reliability indication 341. The cloud storage access reliability indication 339 includes at least one of a level of availability of data of the data storage request (e.g., a number of redundant copies, a number of memory devices, a number of sites, a downtime tolerance level), storage cost information (e.g., data unavailability cost consequence, storage transfer costs), a redundant array of independent disks (RAID) preference indicator, and a data dispersal preference indicator. The cloud storage data reliability indication 341 includes at least one of a data loss cost consequence, a data loss tolerance level (e.g., a number of redundant copies, a number of memory devices, a number of sites), the storage cost information, the RAID preference indicator, and the data dispersal preference indicator. The user device may determine the reliability factors by providing a cloud storage menu to a user and receiving a selection for the cloud storage access reliability indication 339 and a selection for the cloud storage data reliability indication 341.

The DS processing unit 16 dispersed storage error encodes the data file 38 to produce encoded data slices 343 (e.g., a set of encoded data slices for each data segment of the data file 38) in accordance with the reliability factors. The DSN memory 22 stores the encoded data slices 343 in accordance with the reliability factors. The DS processing unit 16 then sends an indication of the dispersed storage error encoding parameters 345 to the user device 13.

FIG. 17B is a diagram of a cloud storage menu 347 that includes potential selection continuums for a cloud storage access reliability 349 and a cloud storage reliability 351. For example, endpoints of the selection continuum for the cloud storage access reliability 349 enable a selection for the cloud storage access reliability indication 353 ranging between 1 nine of reliability and 30 nines reliability. For instance, a user selects 10 nines as the selection for the cloud storage access reliability invitation 353. As another example, endpoints of the selection continuum for the cloud storage reliability 351 enable a selection for the cloud storage data reliability indication 355 ranging between 1 nine of reliability and 30 nines reliability. For instance, the user selects 18 nines as the selection for the cloud storage reliability invitation 355.

Figure 18:
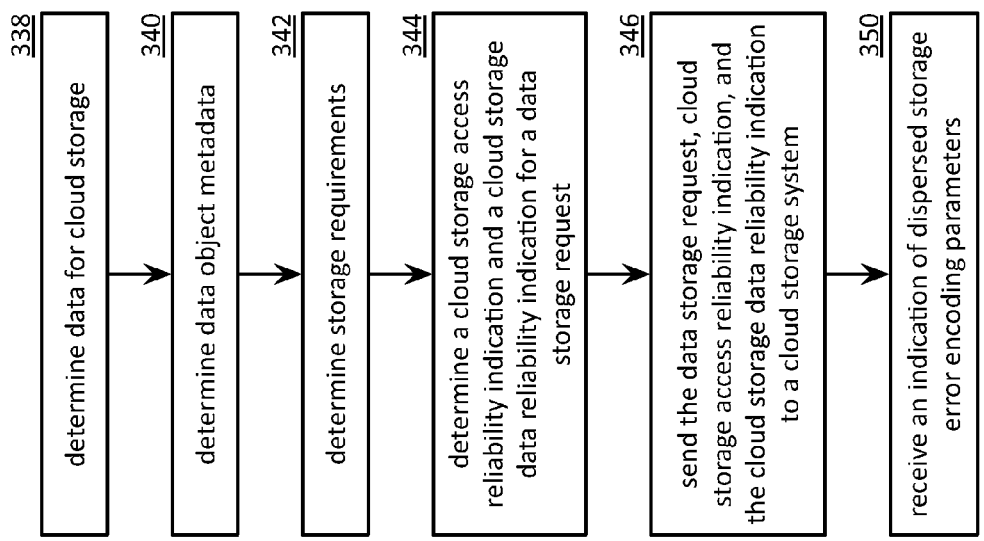
FIG. 18 is a flowchart illustrating an example of generating a store data object request in accordance with the invention.

FIG. 18 is a flowchart illustrating an example of generating a store data object request. A method begins at step 338 where a processing module determines that a data storage request is a cloud data storage request. Such a determination may be based on one or more of a received data object, a data type indicator, a request, a command, a message, a list, a predetermination, and an application output. For example, the processing module determines that the data storage request is the cloud data storage request when the data type indicator associated with the received data object indicates video evidence and a storage list recommends storing video evidence in a cloud storage system.

The method continues at step 340 where the processing module determines data object metadata. Such data object metadata may include one or more of a data type, a data size, a hash of the data object, a user identifier (ID), a reliability indicator, an availability indicator, a security indicator, a performance indicator, and an estimated access frequency indicator. Such a determination may be based on one or more of a data object, a request, a command, a message, a list, a predetermination, an application output, and a data object analysis. For example, the processing module determines the data object metadata to include a reliability indicator that indicates a higher level of required reliability when the data object includes important financial records based on a data object analysis. The method continues at step 342 where the processing module determines storage requirements based on one or more of the data object metadata, a data object, a request, a command, a message, a list, a predetermination, an application output, and a data object analysis. For example, the processing module determines storage requirements to include high storage reliability when the data object metadata includes a high reliability indicator.

The method continues at step 344 where the processing module determines at least one of a cloud storage access reliability indication and a cloud storage data reliability indication for the data storage request (e.g., reliability factors). Such a determination may include providing a cloud storage menu upon receiving the data storage request and receiving at least one of a selection for the cloud storage access reliability indication and a selection for the cloud storage data reliability indication. For example, the processing module provides the cloud storage menu and receives a 10 nines selection for the cloud storage access reliability indication and a 18 nines for the cloud storage data reliability indication.

Alternatively, determining one or both of the reliability factors may include determining a data type of the data in the data storage request, which may further be done by accessing a register to obtain a user data type setting and/or a system data type setting for one or both of the reliability factors. As another alternative, one or both of the reliability factors may be determined based on an application type that generated data of the data storage request, which may further be done by accessing a register to obtain a user application type setting and/or a system application type setting for one or both of the reliability factors. As yet another example, one or both of the reliability factors may be determined by accessing a register to obtain a default system setting and/or a user-defined default setting for one or both of the reliability factors.

The method continues at step 346 for the processing module sends the data storage request and the cloud storage access reliability indication and/or the cloud storage data reliability indication to a cloud storage system. The method continues at step 350 where the processing module receives an indication of dispersed storage error encoding parameters from the cloud storage system in response to the data storage request. For example, the indication of dispersed storage error encoding parameters includes a pillar width of 8 and a decode threshold of 5 even though even though an ideal match of the cloud storage access reliability indication and the cloud storage data reliability indication includes a pillar width of 10 and a decode threshold of 6. Alternatively, or in addition to, the processing module may determine whether the indication of dispersed storage error encoding parameters compares favorably to the cloud storage access reliability indication and the cloud storage data reliability indication. The processing module resends a new data storage request including at least one of a different cloud storage access reliability indication and a different cloud storage data reliability indication when the processing module determines that the comparison is unfavorable.

Figure 19:
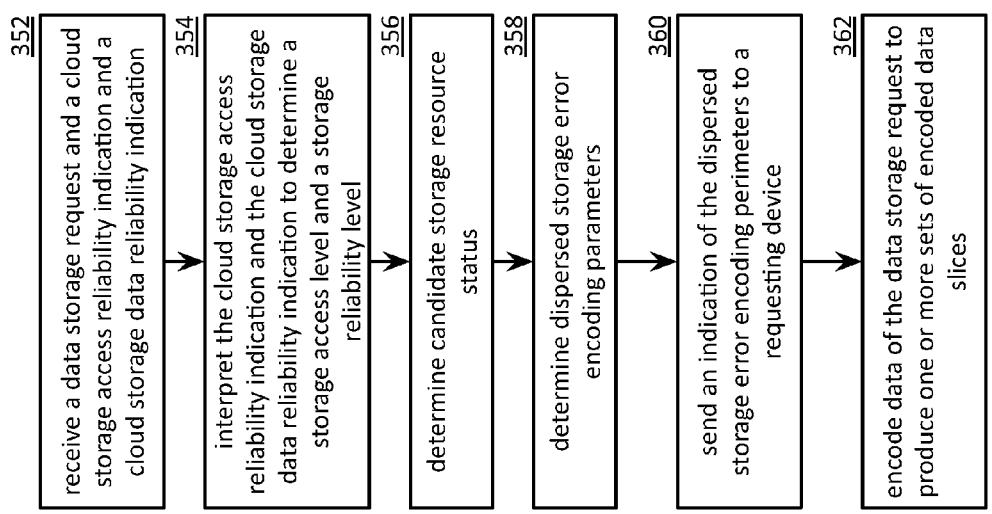
FIG. 19 is a flowchart illustrating an example of generating a store data object response in accordance with invention.

FIG. 19 is a flowchart illustrating an example of generating a store data object response. A method begins at step 352 where a processing module receives a data storage request and at least one of a cloud storage access reliability indication and a cloud storage data reliability indication. Alternatively, or in addition to, the processing module may receive one or more of a data object, requested storage parameters, a user identifier (ID), a command (e.g., store, read, modify, delete, list, etc.), a priority indicator, a security indicator, and a performance indicator.

The method continues at step 354 where the processing module interprets the cloud storage access reliability indication and/or the cloud storage data reliability indication to determine at least one of a storage access level and a storage reliability level. The method continues at step 356 where the processing module determines candidate storage resource status where the status indicates one or more of memory capacity, a memory utilization, available memory, access latency, availability, cost, performance history, and security history. Such a determination may be based on one or more of a user ID, a vault lookup, a query, a list, a command, a message, a predetermination, and a history record.

The method continues at step 358 where the processing module determines dispersed storage error encoding parameters based on the at least one of the storage access level and the storage reliability level. Such a determination includes at least one of determining a pillar width and a spacing between a decode threshold and a read threshold based on the storage access level, wherein the pillar width and the spacing between the decode threshold and the read threshold are proportional to the storage access level, determining a spacing between the decode threshold and the pillar width based on the storage reliability level, wherein the spacing between the decode threshold and the pillar width is proportional to the storage reliability level, determining a spacing between a write threshold and the pillar width based on the storage access level, wherein the spacing between the write threshold and the pillar width are proportional to the storage access level, and determining a spacing between the decode threshold and the write threshold based on the storage reliability level, wherein the spacing between the decode threshold and write threshold is proportional to the storage reliability level. For example, the processing module determines the dispersed storage error encoding parameters to include a read threshold of 13 and a decode threshold of 10 when the storage access level is 10 nines. As another example, the processing module determines the dispersed storage error encoding parameters to include a pillar width of 16 and a decode threshold of 10 when the storage reliability level includes 18 nines.

The method continues at step 360 where the processing module sends an indication of the dispersed storage error encoding parameters to a requesting device associated with the data storage request. Such an indication of the dispersed storage error coding parameters may include one or more of a direct indication of the dispersed storage error coding parameters (e.g., a pillar width, a right threshold, a read threshold, a decode threshold, etc.) and an indirect indication of the dispersed storage error coding parameters (e.g., an equivalent redundant array of independent disks (RAID) level, an equivalent replication level). The method continues at step 362 where the processing module encodes data of the data storage request based on the dispersed storage error encoding parameters to produce one or more sets of encoded data slices. Alternatively, or in addition to, the processing module sends the one or more sets of encoded data slices to at least some candidate storage resources of a dispersed storage network (DSN) memory.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A file directory system comprises:
   memory for storing:
      a directory file including:
         one or more directory entries;
         one or more corresponding addresses for the one or more directory entries;
      a directory address for the directory file; and
   one or more processing devices configured to function as a directory address failsafe mechanism operable to:
      dispersed storage error encode the directory address to produce a plurality of encoded components of the directory address; and
      transmit the plurality of encoded components of the directory address to a plurality of agent modules.

2. The file directory system of claim 1, wherein the directory entry comprises at least one of:
   a directory path name; and
   a file name.

3. The file directory system of claim 1 further comprises:
   the directory address including a dispersed storage network (DSN) address; and
   each of the one or more corresponding addresses including a DSN directory entry address.

4. The file directory system of claim 1 further comprises:
   the directory file constituting a root directory file; and
   the directory address constituting a root directory address.

5. The file directory system of claim 4 further comprises:
   an intermediate directory file including:
      one or more intermediate directory entries;
      one or more corresponding intermediate directory entry addresses for the one or more intermediate directory entries;
   an intermediate directory address for the intermediate directory file; and
   an intermediate directory address failsafe mechanism operable to:
      dispersed storage error encode the intermediate directory address to produce a plurality of encoded components of the intermediate directory address; and transmit the plurality of encoded components of the intermediate directory address to a plurality of intermediate directory agent modules.

6. The file directory system of claim 1 further comprises:
a file-level directory file including:
one or more file-level directory entries;
one or more corresponding file-level directory entry addresses for the one or more file-level directory entries;
a file-level directory address for the file-level directory file; and
a file-level directory address failsafe mechanism operable to:
dispersed storage error encode the file-level directory address to produce a plurality of encoded components of the file-level directory address; and
transmit the plurality of encoded components of the file-level directory address to a plurality of file-level directory agent modules.

7. The file directory system of claim 1, wherein the directory file further comprises:
one or more redundant directory entries; and
one or more corresponding redundant directory entry addresses for the one or more redundant directory entries.

8. The file directory system of claim 1 further comprises:
an intermediate directory file corresponding to one of the one or more directory entries, wherein
the intermediate directory file includes:
one or more intermediate directory entries;
one or more corresponding intermediate directory entry addresses for the one or more intermediate directory entries;
an intermediate directory address for the intermediate directory file, wherein the corresponding address of the one of the one or more directory entries constitutes the intermediate directory address; and
the directory address failsafe mechanism operable to:
dispersed storage error encode the intermediate directory address to produce a plurality of encoded components of the intermediate directory address; and
transmit the plurality of encoded components of the intermediate directory address to a plurality of agent modules.

9. The file directory system of claim 1 further comprises:
a decoding module operable to:
retrieve a threshold number of the encoded components of the directory address from at least some of the plurality of agent modules; and
reconstruct the directory address from the threshold number of encoded components.

10. A method for accessing a file system, the method comprises:
receiving a file access request;
identifying a directory file path based on the file access request;
determining that a directory address of a directory file of the directory file path is not available;
when the directory address is not available, determining whether to reconstruct the directory address or to use a redundant directory file path; and
when reconstructing the directory address:
retrieving encoded components of the directory address from a plurality of agent modules; and
when at least a threshold number of the encoded components of the directory address have been received, reconstructing the directory address from the at least a threshold number of the encoded components of the directory address.

11. The method of claim 10 further comprises:
when using the redundant directory file path, determining one or more directory addresses for one or more redundant directory files in the redundant directory file path; and
accessing a file via the one or more directory addresses of the redundant directory file path.

12. The method of claim 10, wherein the directory address comprises:
a dispersed storage network (DSN) directory address.

13. The method of claim 10, wherein the directory file comprises at least one of:
a root directory file;
an intermediate directory file; and
a file-level directory file.

14. The method of claim 10, wherein the identifying the directory file path when the file access request is a write data request comprises:
determining whether the directory file path exists;
when the directory file path does not exist, creating the directory file path;
determining whether to create a redundant directory file path; and
when it is determined to create the redundant directory file path, creating the redundant directory file path.

15. A computer device comprises:
an interface;
a processing module operable to:
receive, via the interface, a file access request;
identify a directory file path based on the file access request;
determine that a directory address of a directory file of the directory file path is not available;
when the directory address is not available, determine whether to reconstruct the directory address or to use a redundant directory file path; and
when reconstructing the directory address:
retrieve, via the interface, encoded components of the directory address from a plurality of agent modules; and
when at least a threshold number of the encoded components of the directory address have been received, reconstruct the directory address from the at least a threshold number of the encoded components of the directory address.

16. The computer of claim 15, wherein the processing module for the functions to:
when using the redundant directory file path, determine one or more directory addresses for one or more redundant directory files in the redundant directory file path; and
access, via the interface, a file via the one or more directory addresses of the redundant directory file path.

17. The computer of claim 15, wherein the directory address comprises:
a dispersed storage network (DSN) directory address.

18. The computer of claim 15, wherein the directory file comprises at least one of:
a root directory file;
an intermediate directory file; and
a file-level directory file.

19. The computer of claim 15, wherein the processing module functions to identify the directory file path when the file access request is a write data request by:

determining whether the directory file path exists;
when the directory file path does not exist, creating the directory file path;
determining whether to create a redundant directory file path; and
when it is determined to create the redundant directory file path, creating the redundant directory file path.

* * * * *

UNITED STATES PATENT AND TRADEMARK OFFICE
CERTIFICATE OF CORRECTION

PATENT NO.        : 8,707,091 B2                                                        Page 1 of 1
APPLICATION NO.   : 13/021657
DATED             : April 22, 2014
INVENTOR(S)       : Gladwin et al.

It is certified that error appears in the above-identified patent and that said Letters Patent is hereby corrected as shown below:

In the Claims

Col. 38, line 50, in claim 16: replace "for the functions to" with --further functions to--

Signed and Sealed this
Fifteenth Day of September, 2015

Michelle K. Lee
*Director of the United States Patent and Trademark Office*